(12) United States Patent
McMahon

(10) Patent No.: US 12,445,043 B1
(45) Date of Patent: Oct. 14, 2025

(54) FREQUENCY SOFT-START FOR ROTARY POWER TRANSFORMER

(71) Applicant: Waymo LLC, Mountain View, CA (US)

(72) Inventor: Morgan Lane McMahon, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 275 days.

(21) Appl. No.: 18/225,520

(22) Filed: Jul. 24, 2023

(51) Int. Cl.
*H02M 1/32* (2007.01)
*H02M 1/08* (2006.01)
*H02M 3/335* (2006.01)

(52) U.S. Cl.
CPC .............. *H02M 1/32* (2013.01); *H02M 1/08* (2013.01); *H02M 3/33569* (2013.01)

(58) Field of Classification Search
CPC ....... H02M 1/32; H02M 1/08; H02M 3/33569
See application file for complete search history.

(56) References Cited

U.S. PATENT DOCUMENTS

| | | |
|---|---|---|
| 4,808,868 A | 2/1989 | Roberts |
| 5,132,617 A | 7/1992 | Leach et al. |
| 5,757,157 A | 5/1998 | Falk et al. |
| 6,860,159 B2 | 3/2005 | Jin et al. |
| 7,690,788 B2 | 4/2010 | Yamada et al. |
| 8,018,740 B2 | 9/2011 | Ye et al. |
| 8,456,868 B2 | 6/2013 | Jeoh et al. |
| 8,508,958 B2 | 8/2013 | Demone et al. |
| 9,257,913 B1 | 2/2016 | McDonald |
| 9,685,825 B2 | 6/2017 | Shimokawa |
| 9,912,254 B2 | 3/2018 | Delforge |
| 9,929,638 B2 | 3/2018 | Afsharian et al. |

(Continued)

FOREIGN PATENT DOCUMENTS

| | | |
|---|---|---|
| CN | 109889036 A | 6/2019 |
| EP | 3179622 A1 | 6/2017 |

OTHER PUBLICATIONS

Deng et al., "Design Methodology of LLC Resonant Converters for Electric Vehicle Battery Chargers," IEEE Transactions on Vehicular Technology, vol. 63, No. 4, May 2014.

(Continued)

*Primary Examiner* — Kyle J Moody
(74) *Attorney, Agent, or Firm* — McDonnell Boehnen Hulbert & Berghoff LLP

(57) ABSTRACT

A system includes a control circuit and a LLC resonant power converter. The control circuit is configured to generate a first gate drive signal to initiate operation of the LLC resonant power converter at a first frequency. The LLC resonant power converter is configured to drive a wireless power signal at a primary winding of a rotary power transformer disposed on a first platform and transmit the wireless power signal across a gap separating the first platform and a second platform that rotates relative to the first platform. The LLC resonant power converter is configured to operate, in an open loop mode without feedback control, a device mounted on the second platform. In response to satisfaction of a condition, the control circuit is configured to generate a second gate drive signal to operate the LLC resonant power converter at a second frequency that is lower than the first frequency.

20 Claims, 23 Drawing Sheets

(56) References Cited

U.S. PATENT DOCUMENTS

| | | | |
|---|---|---|---|
| 10,181,804 | B1 | 1/2019 | Zhang et al. |
| 10,264,650 | B2 | 4/2019 | Jungwirth |
| 10,277,084 | B1 | 4/2019 | Karplus |
| 10,277,130 | B2 | 4/2019 | Quigley |
| 10,277,890 | B2 | 4/2019 | Kerstein |
| 10,320,243 | B2 | 6/2019 | Tokura et al. |
| 10,340,807 | B2 | 7/2019 | Chen et al. |
| 10,369,891 | B2 | 8/2019 | Elshaer et al. |
| 10,622,883 | B2 | 4/2020 | Stuler et al. |
| 10,749,308 | B2 | 8/2020 | Pardhan et al. |
| 11,031,860 | B2 | 6/2021 | Afsharian et al. |
| 11,575,327 | B2 | 2/2023 | Magsino et al. |
| 11,594,948 | B2 | 2/2023 | Bradley et al. |
| 11,841,465 | B1* | 12/2023 | Jones .................... G01S 7/4861 |
| 2010/0038970 | A1 | 2/2010 | Cook et al. |
| 2011/0141771 | A1 | 6/2011 | Kyrberg |
| 2013/0294113 | A1 | 11/2013 | Liang et al. |
| 2014/0252813 | A1 | 9/2014 | Lee et al. |
| 2014/0354225 | A1 | 12/2014 | Kitamura |
| 2017/0331383 | A1 | 11/2017 | Hsiao et al. |
| 2018/0123412 | A1 | 5/2018 | Karplus et al. |
| 2022/0158536 | A1 | 5/2022 | Jaksa |
| 2022/0187458 | A1* | 6/2022 | Piggott .................... G01S 17/36 |

OTHER PUBLICATIONS

Abdel-Rahman, "Resonant LLC Converter: Operation and Design," Infineon Technologies North America (IFNA) Corp., Application Note AN Sep. 2012, Sep. 2012.

G. Rizzoli, M. Mengoni, L. Zarri and A. Tani, "Voltage Feedback of an LLC Resonant Converter with a Rotary Transformer," IECON 2018—44th Annual Conference of the IEEE Industrial Electronics Society, Washington, DC, USA, 2018, pp. 1568-1573, doi: 10.1109/IECON.2018.8592682. (Year: 2018).

Designing an LLC Resonant Half-Bridge Power Converter 2010 Texas Instruments Power Supply Design Seminar SEM1900, Topic 3 (Year: 2010).

Chao Fei et al., "Soft Start-Up for High Frequency LLC Resonant Converter With Optimal Trajectory Control", May 1, 2015 Center for Power Electronics Systems, Virginia Tech, Blacksburg, VA, USA.

Fei Xue et al. "An Open-Loop Start-up Method for LLC Resonant Converter with Fixed Frequency and Variable Duty Cycle", Jan. 1, 2022, 2021 International Conference on Advanced Electrical and Energy Systems, Journal of Physics: Conference Series.

* cited by examiner

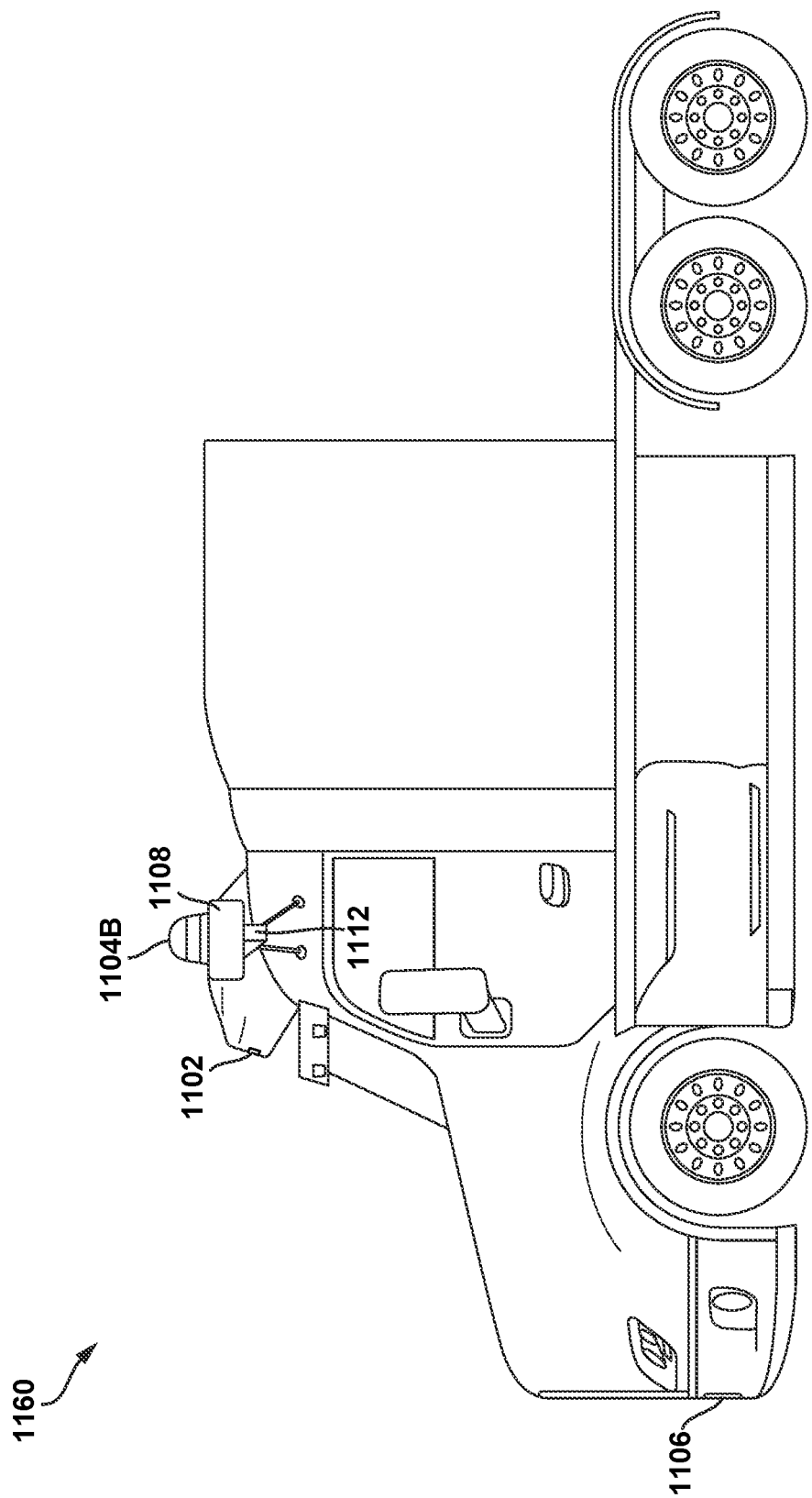

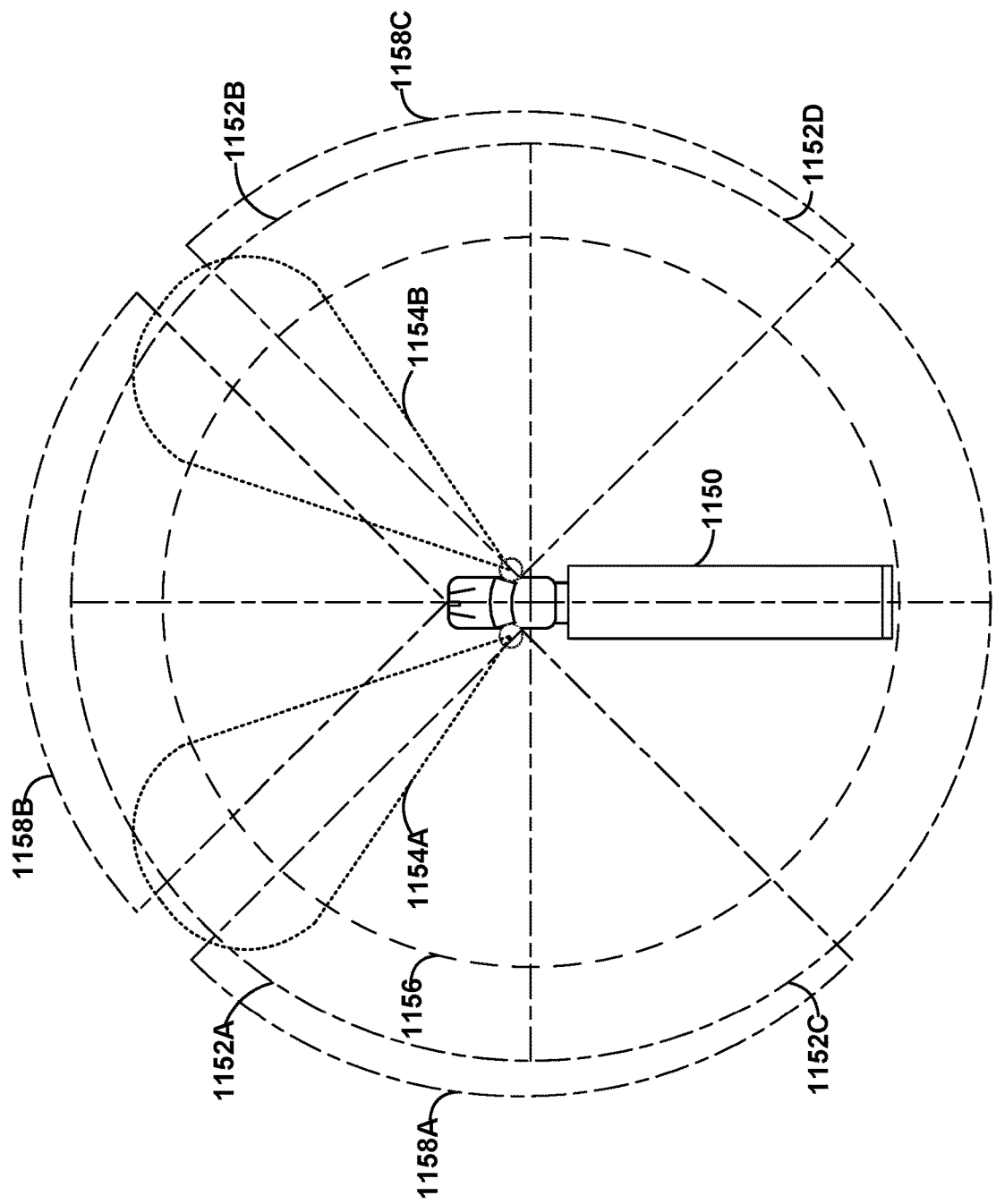

FREQUENCY SOFT-START FOR ROTARY POWER TRANSFORMER

BACKGROUND

Unless otherwise indicated herein, the description in this section is not prior art to the claims in this application and is not admitted to be prior art by inclusion in this section.

LLC resonant power converters can be used to deliver power to different devices. As a non-limiting example, an LLC resonant power converter can be used to deliver power to a sensor on a vehicle, such as a light detection and ranging (LIDAR) device. To efficiently provide power to the LIDAR device, the LLC resonant power converter can operate at a target frequency. However, initiating operation of the LLC resonant power converter at the target frequency can result in startup transients that lead to large current spikes. In some scenarios, these large current spikes at startup can cause circuit components to trip.

SUMMARY

The techniques described herein reduce current spikes during startup of a rotary power transformer. In particular, the techniques described herein "soft-start" the rotary power transformer by implementing a frequency change on a gate drive signal (e.g., an LLC drive signal) provided to an LLC resonant power converter associated with the rotary power transformer. For example, during startup, the gate drive signal applied to a switching network of the LLC resonant power converter can have a first frequency (e.g., a relatively high frequency). As a result, the switching network can drive a wireless power signal at a primary winding of the rotary power transformer based on the first frequency. A resulting wireless power signal can be driven at a secondary winding of the rotary power transformer, via electromagnetic induction, and can be used to charge an output capacitor. By using a higher frequency for the gate drive signal during startup, an LLC gain is reduced (compared to an LLC gain based on a lower frequency gate drive signal), which may prevent or reduce current spikes on a secondary side of the LLC resonant power converter while an output capacitor charges. After a particular period of time elapses and the output capacitor has sufficiently charged, a frequency of the gate drive signal is decreased to a second frequency to increase the LLC gain. As a non-limiting example, the second frequency for the gate drive signal can result in the rotary power transformer having a target gain, such as a unity gain.

A method includes generating, by a control circuit, a first gate drive signal to initiate operation of an LLC resonant power converter at a first frequency. During operation, the LLC resonant power converter is configured to drive a wireless power signal at a primary winding of a rotary power transformer disposed on a first platform. The LLC resonant power converter is also configured to transmit the wireless power signal across a gap separating the first platform and a second platform. The second platform is configured to rotate relative to the first platform. The LLC resonant power converter is also configured to receive the wireless power signal at a secondary winding of the rotary power transformer. The secondary winding is disposed on the second platform. The LLC resonant power converter is further configured to operate, in an open loop mode without feedback control, a device mounted on the second platform based on the secondary winding receiving the wireless power signal. The method also includes generating, by the control circuit and in response to satisfaction of a condition, a second gate drive signal to operate the LLC resonant power converter at a second frequency that is lower than the first frequency.

A system includes a control circuit and an LLC resonant power converter. The control circuit is configured to generate a first gate drive signal to initiate operation of the LLC resonant power converter at a first frequency. During operation, the LLC resonant power converter is configured to drive a wireless power signal at a primary winding of a rotary power transformer disposed on a first platform. The LLC resonant power converter is also configured to transmit the wireless power signal across a gap separating the first platform and a second platform. The second platform is configured to rotate relative to the first platform. The LLC resonant power converter is also configured to receive the wireless power signal at a secondary winding of the rotary power transformer. The secondary winding is disposed on the second platform. The LLC resonant power converter is further configured to operate, in an open loop mode without feedback control, a device mounted on the second platform based on the secondary winding receiving the wireless power signal. In response to satisfaction of a condition, the control circuit is further configured to generate a second gate drive signal to operate the LLC resonant power converter at a second frequency that is lower than the first frequency.

A non-transitory computer-readable medium includes instructions that, when executed by a microcontroller, cause the microcontroller to perform operations. The operations include generating a first gate drive signal to initiate operation of an LLC resonant power converter at a first frequency. During operation, the LLC resonant power converter is configured to drive a wireless power signal at a primary winding of a rotary power transformer disposed on a first platform. The LLC resonant power converter is also configured to transmit the wireless power signal across a gap separating the first platform and a second platform. The second platform is configured to rotate relative to the first platform. The LLC resonant power converter is also configured to receive the wireless power signal at a secondary winding of the rotary power transformer. The secondary winding is disposed on the second platform. The LLC resonant power converter is further configured to operate, in an open loop mode without feedback control, a device mounted on the second platform based on the secondary winding receiving the wireless power signal. The operations also include generating, in response to satisfaction of a condition, a second gate drive signal to operate the LLC resonant power converter at a second frequency that is lower than the first frequency.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 11H is an illustration of a physical configuration of a vehicle, according to example embodiments.

FIG. 11J is an illustration of a field of view for various sensors, according to example embodiments.

DETAILED DESCRIPTION

Figure 1:
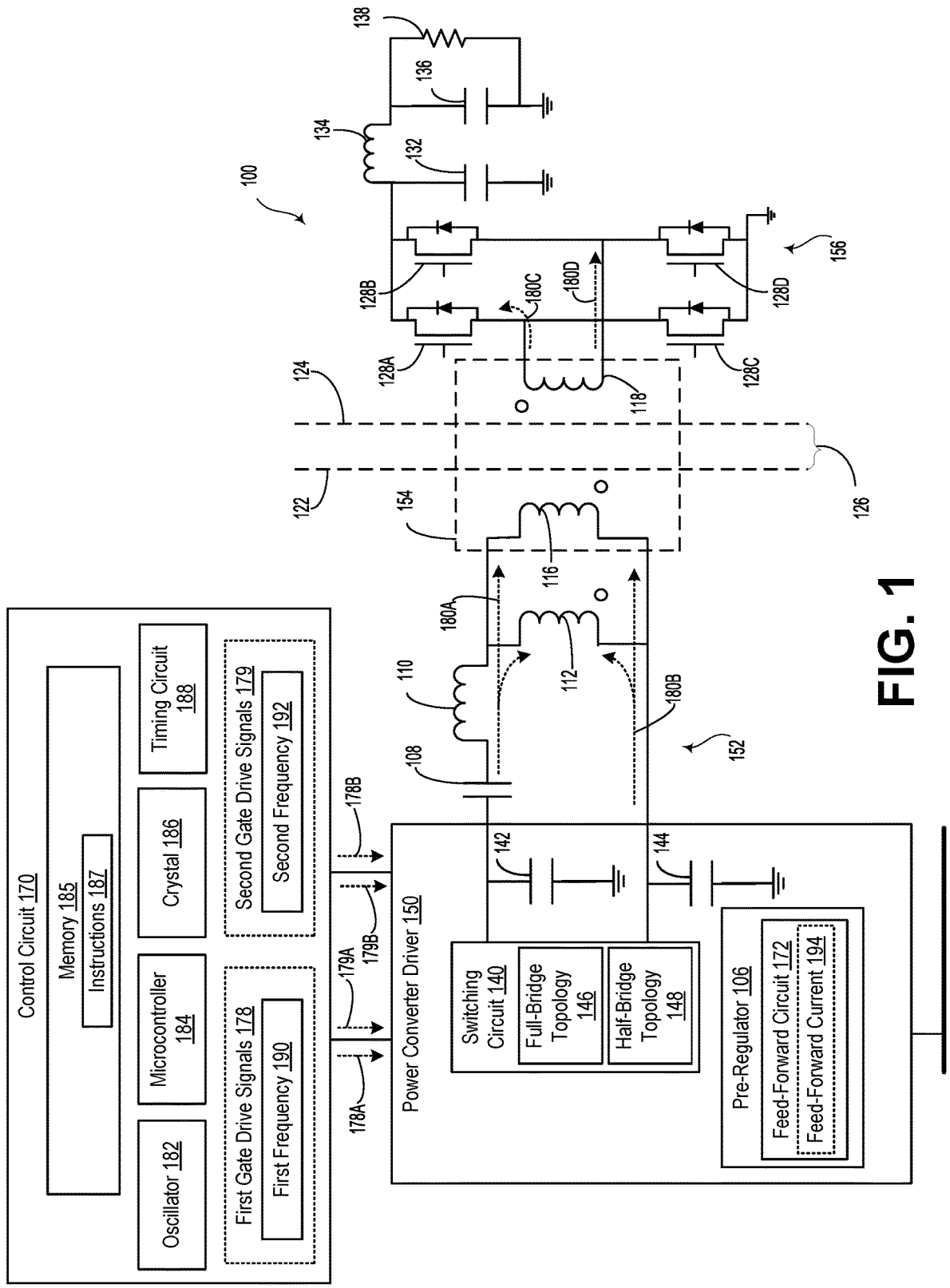
FIG. 1 is a diagram of an LLC resonant power converter, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

The techniques described herein reduce current spikes during startup of an LLC resonant power converter associated with a rotary power transformer. For example, the techniques described herein enable the LLC resonant power converter to undergo a "soft-start" by implementing a frequency change on a gate drive signal (e.g., an LLC drive signal) provided to the LLC resonant power converter.

To illustrate, the LLC resonant power converter can include a switching network, a resonant tank (e.g., an LLC circuit), a rotary power transformer, and an output rectifier. The switching network, the resonant tank, and a primary winding of the rotary power transformer are disposed on a first platform. A secondary winding of the rotary power transformer and the output rectifier are disposed on a second platform that is configured to rotate relative to the first platform. During operation, power switches in the switching network can be selectively activated by one or more gate drive signals. As a non-limiting example, each power switch can correspond to one or more transistors that are selectively activated based on a gate drive signal applied to a gate of the corresponding transistor(s). The power switches can have a full-bridge topology or a half-bridge topology. In response to activating a power switch, a wireless power signal (e.g., a current signal) can be driven at the primary winding of the rotary power transformer via the resonant tank. A resulting wireless power signal (e.g., a resulting current signal) can be driven at the secondary winding of the rotary power transformer, via electromagnetic induction, and can be used to charge an output capacitor. The output rectifier can convert a voltage across the output capacitor (e.g., an output voltage) into a direct current (DC) voltage that is used to power a load, such as a LIDAR device.

However, during startup of the LLC resonant power converter, a resistance of the primary winding, a resistance of the secondary winding, a gain of the resonant tank (e.g., a frequency and load dependent gain), and a gain of the rotary power transformer (e.g., a turns-ratio gain) often function as the current limiting components for the wireless power signal (e.g., the current signal) because the output capacitor has not yet charged, and thus operates similarly to a short circuit. As a result, the LLC resonant power converter is subject to large current spikes and can draw up to five (5) times its continuous peak operating power.

To reduce the current spikes (e.g., the inrush at startup), a control circuit is configured to soft-start the LLC resonant power converter at a higher frequency than a target frequency (e.g., a unity gain frequency or a resonant frequency). For example, to soft-start the LLC resonant power converter, the control circuit can generate a first gate drive signal to initiate operation of the LLC resonant power converter at a first frequency. To illustrate, the control circuit can include an oscillator that can be set to the first frequency (e.g., a high frequency) or a second frequency. The second frequency can correspond to a lower frequency, such as a target frequency or a unity gain frequency. During startup, the oscillator is set to the first frequency, and the resulting first gate drive signal is applied to the switching network. Operating the LLC resonant power converter at the first frequency reduces a gain (e.g., an LLC gain) during the startup, as compared to an LLC gain associated with the target frequency, and thus reduces current spikes on the secondary side of the rotary power transformer as the output capacitor charges.

After a soft-start period has expired, the control circuit can generate a second gate drive signal to operate the LLC resonant power converter at the second frequency. The second gate drive signal has a lower frequency than the first gate drive signal. According to one implementation, a timer delay circuit can be used to control the duration of the soft-start period. To illustrate, a soft-start control signal can be applied to an input of the oscillator, and a voltage of the soft-start control signal can be controlled by the timer delay circuit. The timer delay circuit can include an internal timer delay associated with a microcontroller, a resistive-capacitive (RC) timer delay circuit, or another type of timer delay circuit. After a delay associated with the timer delay circuit, the voltage of the soft-start control signal can transition from a low voltage state to a high voltage state, which in turn, sets the oscillator to the second frequency and causes the oscillator to generate the second gate drive signal after the soft-start period. The second gate drive signal is applied to the switching network and causes the LLC resonant power converter to operate at the second frequency (i.e., the target frequency or the unity gain frequency).

Thus, the techniques described herein can reduce current spikes during startup of the LLC resonant power converter. For example, by operating the LLC resonant power converter at a relatively high frequency during startup, the gain of the rotary power transformer is reduced as the output capacitor charges. As a result, current on the secondary side of the rotary power transformer is reduced and the likelihood of circuit components tripping during startup is reduced. By the time the soft-start period expires, the output capacitor will have sufficiently charged to reduce current spikes that could otherwise cause circuit components (e.g., power supplies and load switches) to trip if the LLC resonant power converter was initially driven by the lower frequency gate drive signal.

Although the above example describes soft-starting the LLC resonant power converter using a single discrete frequency step, in other implementations, the soft-start for the LLC resonant power converter can include multiple frequency steps. Additionally, other mechanisms can be used to generate the gate drive signals. As non-limiting examples, a microcontroller, a crystal, an application-specific integrated circuit (ASIC), a central processing unit (CPU), a graphics processing unit (GPU), a tensor processing unit (TPU), or another timing circuit (e.g., clock source) can be used to generate the gate drive signals.

The following description and accompanying drawings will elucidate features of various example embodiments. The embodiments provided are by way of example, and are not intended to be limiting. As such, the dimensions of the drawings are not necessarily to scale.

Particular embodiments are described herein with reference to the drawings. In the description, common features are designated by common reference numbers throughout the drawings. In some figures, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple gate drive signals are illustrated and associated with reference numbers 178A, 178B, etc. When referring to a particular one of these gate drive signals, such as the gate drive signal 178A, the distinguishing letter "A" is used. However, when referring to any arbitrary one of these gate drive signals or to these gate drive signals as a group, the reference number 178 is used without a distinguishing letter.

FIG. 1 is a diagram of an LLC resonant power converter 100, according to an example embodiment. The LLC resonant power converter 100 is associated with a rotary power transformer. For example, the LLC resonant power converter 100 includes a power converter driver 150, a resonant tank 152, a rotary power transformer 154, and a rectifier circuit 156. According to some implementations, the LLC resonant power converter 100 can be configured to wirelessly provide power to a device. As a non-limiting example, the LLC resonant power converter 100 can be configured to wirelessly provide power to a LIDAR device, such as the LIDAR device 1010 of FIGS. 10A-10B.

The power converter driver 150 includes a switching circuit 140. The switching circuit 140 includes power switches that are configured to generate a square wave signal. The power switches can be implemented using a full-bridge topology 146 or a half-bridge topology 148. The full-bridge topology 146 can be configured to generate a square wave signal without a DC offset, such that an amplitude of the square wave signal is equal to an input voltage. The half-bridge topology 148 can be configured to generate a square wave signal that is offset by half of the input voltage, such that the square wave signal in the half-bridge topology 148 has half the amplitude of the square wave signal in the full-bridge topology 146. The soft-start techniques described herein can be implemented using the full-bridge topology 146 or the half-bridge topology 148. As used herein, the square wave signal generated by the switching circuit 140, including any signal produced by the square wave signal by means of filtering, current division, etc., is referred to as a wireless power signal 180.

The power converter driver 150 also includes a capacitor 142 coupled to a first terminal of the switching circuit 140 and a capacitor 144 coupled to a second terminal of the switching circuit 140. The capacitor 142 is used to shape a pulse of the wireless power signal 180A output from the first terminal of the switching circuit 140, and the capacitor 144 is used to shape a pulse of the wireless power signal 180B output from the second terminal of the switching circuit 140. When a power switch associated with the first terminal (coupled to the capacitor 142) is activated, the wireless power signal 180A is outputted from the switching circuit 140 and propagates through the resonant tank 152 and the rotary power transformer 154 according to a first path (indicated by the dashed arrow associated with the wireless power signal 180A). When a power switch associated with the second terminal (coupled to the capacitor 144) is activated, the wireless power signal 180B is outputted from the switching circuit 140 and propagates through the resonant tank 152 and the rotary power transformer 154 according to a second path (indicated by the dashed arrow associated with the wireless power signal 180B).

Activation of the power switches can be controlled by gate drive signals 178, 179 from a control circuit 170. The gate drive signals 178A, 178B can correspond to a pair of complementary signals that are provided to respective power switches in the switching circuit 140 to operate the LLC resonant power converter 100 at a first frequency 190, and the gate drive signals 179A, 179B can correspond to another pair of complementary signals that are provided to respective power switches in the switching circuit 140 to operate the LLC resonant power converter 100 at a second frequency 192. As described below, the control circuit 170 can soft-start the LLC resonant power converter 100 by controlling a frequency of the gate drive signals 178, 179.

The resonant tank 152 includes an LLC circuit. For example, the resonant tank 152 includes an inductor (L) 110, an inductor (L) 112, and a capacitor (C) 108. The resonant tank 152 can be tuned to a resonant frequency defined by a capacitance of the capacitor 108, an inductance of the inductor 110, and an inductance of the inductor 112. At the resonant frequency, an impedance of the resonant tank is zero, and the input voltage (e.g., the input voltage of the switching circuit 140) is applied to the load. According to one implementation, the resonant tank 152 can filter out the harmonics of the square wave signal (e.g., the wireless power signal 180) to create a sinusoidal current waveform.

The rotary power transformer 154 includes a primary winding 116 and a secondary winding 118. The rotary power transformer 154 can be, for example, a toroidal transformer, or another type of transformer. The primary winding 116 and the secondary winding 118 can be separated by a gap 126 determined by a first platform 122 and a second platform 124. Although a single primary winding 116 and a single secondary winding 118 are illustrated, in other implementations, the rotary power transformer 154 can include any number of primary windings 116 and any number of secondary windings 118. The wireless power signal 180 (e.g., a current signal) can be driven at the primary winding 116 of the rotary power transformer 154 via the resonant tank 152, as illustrated in FIG. 1. A resulting wireless power signal 180C, 180D (e.g., a resulting current signal) can be driven at the secondary winding 118 of rotary power transformer 154 via electromagnetic induction.

The rectifier circuit 156 includes one or more filters. For example, as shown in FIG. 1, the rectifier circuit 156 includes a plurality of metal oxide semiconductor field effect transistors (MOSFETs) 128 and an output capacitor-inductor-capacitor (CLC) filter. The MOSFETs 128A, 128B, 128C, 128D can correspond to a full bridge synchronous rectifier. In some implementations, the gates of the MOSFETs 128 can be controlled using control logic (not shown). Although illustrated as a synchronous rectifier, in other implementations, the rectifier circuit 156 can include a plurality of diodes.

The output CLC filter includes the capacitor (C) 132, an inductor (L) 134, and a capacitor (C) 136. The CLC filter may exclude a range of frequencies. As a non-limiting example, the CLC filter can act as a low pass filter configured to filter out frequencies below an expected operating point, such as a unity gain operating point. The resulting wireless power signal 180C, 180D can be used to charge the capacitors 132, 136. The rectifier circuit 156 can convert a voltage across the output capacitor 136 (e.g., an output voltage) into a DC voltage that is used to power a load 138. The load 138 is depicted as a resistor, which represents a power consumption capacity of a device (e.g., a LIDAR device). The load 138 may change in accordance with the power intake of the device. Thus, collectively, the power converter driver 150, the resonant tank 152, the rotary power transformer 154, and the rectifier circuit 156 are configured to wirelessly transmit power from a first device (e.g., one or more components of the vehicle 1100 of FIG. 11) to a second device (e.g., the LIDAR device 1010 of FIGS. 10A-10B).

The power converter driver 150, the resonant tank 152, and the primary winding 116 can be embedded in the first platform 122. Further, the secondary winding 118 and the rectifier circuit 156 can be embedded in a second platform 124. The first platform 122 and the second platform 124 can be mechanically connected by a rotational component that maintains the gap 126 between the primary winding 116 and the secondary winding 118, while simultaneously mounting the second device (e.g., the LIDAR device 1010) onto the first device (e.g., one or more components of a vehicle 1100).

During startup of the LLC resonant power converter 100, a resistance of the primary winding 116, a resistance of the secondary winding 118, a gain of the resonant tank 152 (e.g., a frequency-dependent gain), and a gain of the rotary power transformer 154 (e.g., a turns-ratio gain) often function as the current limiting components for the wireless power signal 180 (e.g., the current signal) because the output capacitor 136 has not yet charged and operates similarly to a short circuit. As a result, the LLC resonant power converter 100 is subject to large current spikes and can draw up to five (5) times its continuous peak operating power. To reduce the current spikes (e.g., the inrush at startup), the control circuit 170 is configured to soft-start the LLC resonant power converter 100 at a higher frequency than a target frequency (e.g., a unity gain frequency or a resonant frequency).

The control circuit 170 can include an oscillator 182, a microcontroller 184, a crystal 186 (e.g., a crystal oscillator), or another timing circuit 188 (e.g., an ASIC, a CPU, a GPU, a TPU). With respect to below description of FIG. 1, the oscillator 182 is described as performing the soft-start operations of the control circuit 170. However, in other embodiments, the soft-start operations can be performed by the microcontroller 184, the crystal 186, or the other timing circuit 188. As a non-limiting example, the control circuit 170 can also include a memory 185. The memory 185 can correspond to a non-transitory computer-readable medium that stores instructions 187 executable by the microcontroller 184 to perform the soft-start operations described herein. Different embodiments of the control circuit 170 are described in greater detail with respect to FIGS. 2-7. However, it should be understood that these embodiments of the control circuit 170 are merely for illustrative purposes and the soft-start techniques described herein can be performed using any clock-based control circuit configuration.

To soft-start the LLC resonant power converter 100, the oscillator 182 can generate first gate drive signals 178A, 178B to initiate operation of the LLC resonant power converter at a first frequency 190. To illustrate, the oscillator 182 can be set to the first frequency 190 (e.g., a high frequency) or a second frequency 192 (e.g., a target frequency). During startup, the oscillator 182 is set to the first frequency 190 and the resulting first gate drive signals 178 are applied to the switching circuit 140. Because the first gate drive signals 178 oscillate at the high frequency 190, the power switches in the switching circuit 140 activate and deactivate at a relatively high rate (e.g., the first frequency 190). As a result, the gain of the rotary power transformer 154 is relatively low and current spikes are reduced as the output capacitor 136 charges.

After a soft-start period, the oscillator 182 can generate second gate drive signals 179 to operate the LLC resonant power converter 100 at the second frequency 192. According to one implementation, a RC timer delay circuit (not shown) can be used to control the soft-start period. To illustrate, a soft-start control signal can be applied to an input of the oscillator 182, and a voltage of the soft-start control signal can be controlled by the RC timer delay circuit. After a delay associated with the RC timer delay circuit, the voltage of the soft-start control signal can transition from a low voltage state to a high voltage state, which in turn, sets the oscillator 182 to the second frequency 192 (e.g., the lower frequency) and causes the oscillator 182 to generate the second gate drive signals 179 at the second frequency 192. The second gate drive signals 179 are applied to the switching circuit 140 and cause the LLC resonant power converter 100 to operate at the second frequency 192 (i.e., the target frequency). Because the second gate drive signals 179 oscillate at the lower frequency 192, the power switches in the switching circuit 140 activate and deactivate at a relatively low rate (e.g., the second frequency 192). As a result, in some embodiments, the rotary power transformer 154 can operate at a target gain operating point, such as a unity gain operating point. Additionally, by the time the second gate drive signals 179 are applied to the switching circuit 140, the output capacitor 136 is sufficiently charged as to prevent current spikes and component tripping when the LLC resonant power converter 100 operates at the second frequency 192.

As illustrated in FIG. 1, the power converter driver 150 also includes a pre-regulator 106. The pre-regulator 106 includes a feed-forward circuit 172 that can also be used to soft-start the LLC resonant power converter 100. For example, during the soft-start period, the feed-forward circuit 172 can determine (e.g., measure) a feed-forward current 194. Based on the feed-forward current 194, the pre-regulator 106 can be configured to adjust a voltage applied to the power converter driver 150. For example, the pre-regulator 106 can increase or decrease the voltage applied to the switching circuit 140 to soft-start the LLC resonant power converter 100. Adjusting the voltage applied to switching circuit 140 can substantially cancel out the resistive drop in voltage from the LLC gain, the MOSFETs 128, and the winding losses. In some scenarios, the soft-start operation of the control circuit 170 can be performed in conjunction with the soft-start operation of the feed-forward circuit 172.

Although the above example describes soft-starting the LLC resonant power converter 100 using a single discrete frequency step (e.g., from the first frequency 190 to the second frequency 192), in other implementations, the soft-start for the LLC resonant power converter 100 can include multiple (N) frequency steps, where N is an integer greater than two. As a non-limiting example, the control circuit 170 can generate gate drive signals having the first frequency 190 at the beginning of the soft-start period, decrease the frequency of the gate drive signals to an intermediate frequency (between the first frequency 190 and the second frequency 192) at a later time during the soft-start period, and generate gate drive signals 179 having the second frequency 192 after the soft-start period expires.

The techniques described herein can reduce current spikes during startup of the LLC resonant power converter 100. For example, by operating the LLC resonant power converter 100 at a relatively high frequency 190 during startup, the gain of the rotary power transformer 154 is reduced as the output capacitor 136 charges. As a result, current on the secondary side of the LLC resonant power converter 100 is reduced and the likelihood of circuit components tripping during startup is reduced. By the time the soft-start period expires, the output capacitor 136 will have sufficiently charged to reduce current spikes that could otherwise cause circuit components (e.g., power supplies and load switches) to trip.

Figure 2A:
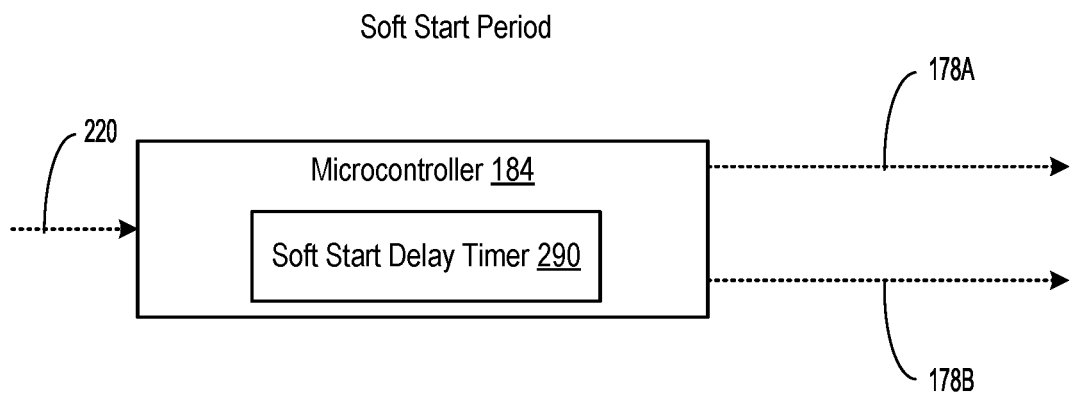
FIG. 2A is a diagram of a microcontroller that generates gate drive signals for an LLC resonant power converter during a soft-start period, according to example embodiments.

FIG. 2A is a diagram of the microcontroller 184 that generates gate drive signals for an LLC resonant power converter during a soft-start period, according to an example embodiment.

The microcontroller 184 can be configured to receive, or generate, a soft-start signal 220 to initiate operation of the LLC resonant power converter 100. In one implementation, the soft-start signal 220 can be received, or generated, in response to detecting a fault at the LLC resonant power converter 100. For example, if a circuit component associated with the LLC resonant power converter 100 trips, the microcontroller 202 can receive, or generate, the soft-start signal 220 to initiate operation of (e.g., restart) the LLC resonant power converter 100. In other implementations, the fault can include detection of an over voltage, detection of an under voltage, detection of an over current, etc.

In another implementation, the soft-start signal 220 can be received, or generated, in response to detecting a command to activate a device mounted on the second platform 124, such as the LIDAR device 1010. According to this implementation, the microcontroller 202 can receive, or generate, the soft-start signal 220 to initiate operation of the LLC resonant power converter 100 to power the device mounted on the second platform 124. It should be understood that above scenarios for triggering the initiation of the soft-start period are merely for illustrative purposes and should not be construed as limiting.

Based on the soft-start signal 220, the microcontroller 184 can be configured to generate the first gate drive signals 178A, 178B (having the first frequency 190) during the soft-start period for the LLC resonant power converter 100. The microcontroller 184 can also include an internal time delay, such as a soft start delay timer 290, to control the duration of the soft-start period.

FIG. 2A is a diagram of the microcontroller 184 that generates gate drive signals for an LLC resonant power converter after a soft-start period, according to an example embodiment.

Figure 2B:
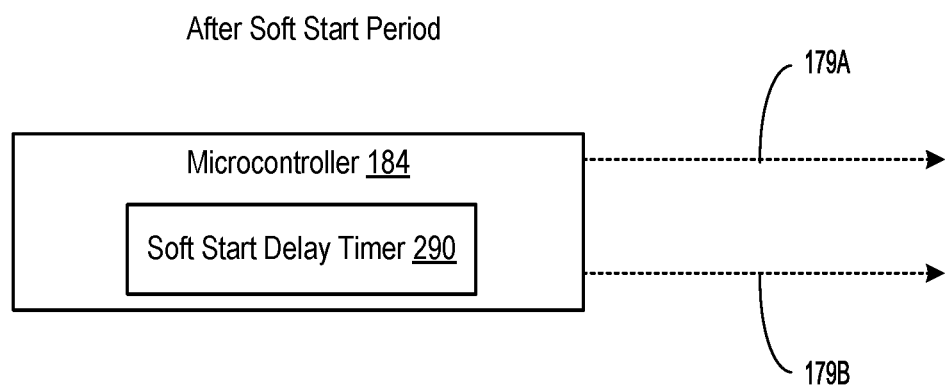
FIG. 2B is a diagram of a microcontroller that generates gate drive signals for an LLC resonant power converter after a soft-start period, according to example embodiments.

In FIG. 2B, after expiration of the soft-start period, the microcontroller 184 can be configured to generate the second gate drive signals 179A, 179B (having the second frequency 192). Thus, after soft start delay timer 290 internal to the microcontroller 184 indicates that the soft-start period has expired, the microcontroller 184 can generate the second gate drive signals 179A, 179B to drive normal operation of the LLC resonant power converter 100.

Figure 3A:
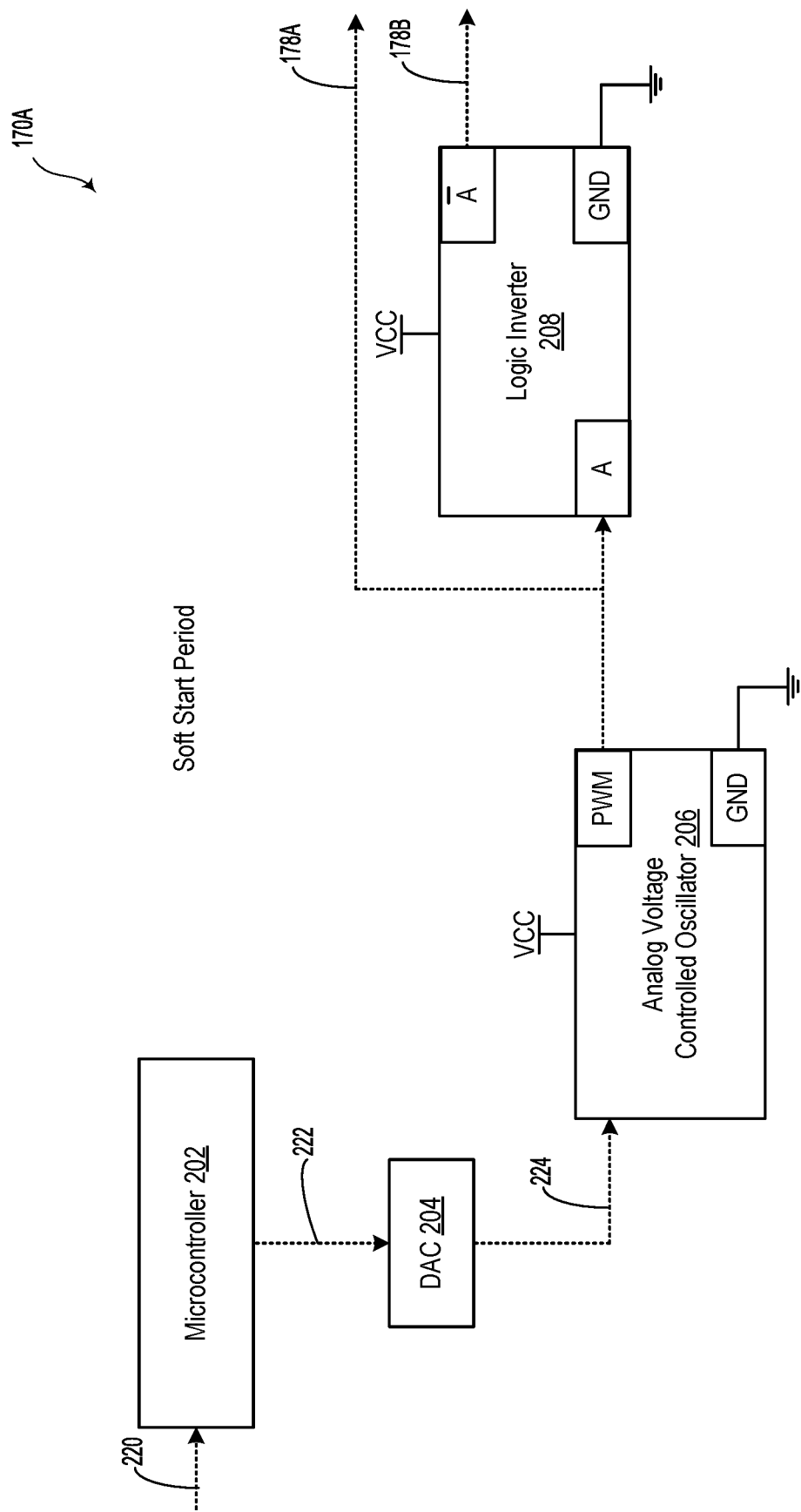
FIG. 3A is a block diagram of a control circuit that generates gate drive signals for an LLC resonant power converter during a soft-start period, according to example embodiments.

FIG. 3A is a block diagram of a control circuit 170A that generates gate drive signals for an LLC resonant power converter during a soft-start period, according to an example embodiment. The control circuit 170A can correspond to the control circuit 170 of FIG. 1. The control circuit 170A includes a microcontroller 202, a digital-to-analog converter (DAC) 204, an analog voltage controlled oscillator 206, and a logic inverter 208. In some implementations, the analog voltage controlled oscillator 206 can correspond to the oscillator 182 of FIG. 1. In some implementations, the microcontroller 202 can correspond to the microcontroller 184 of FIG. 1. In the illustration of FIG. 3A, the control circuit 170A is configured to generate the first gate drive signals 178A, 178B (having the first frequency 190) during the soft-start period for the LLC resonant power converter 100.

To illustrate, the microcontroller 202 can be configured to receive, or generate, a soft-start signal 220 to initiate operation of the LLC resonant power converter 100. In one implementation, the soft-start signal 220 can be received, or generated, in response to detecting a fault at the LLC resonant power converter 100. For example, if a circuit component associated with the LLC resonant power converter 100 trips, the microcontroller 202 can receive, or generate, the soft-start signal 220 to initiate operation of (e.g., restart) the LLC resonant power converter 100. In another implementation, the soft-start signal 220 can be received, or generated, in response to detecting a command to activate a device mounted on the second platform 124, such as the LIDAR device 1010. According to this implementation, the microcontroller 202 can receive, or generate, the soft-start signal 220 to initiate operation of the LLC resonant power converter 100 to power the device mounted on the second platform 124. It should be understood that above scenarios for triggering the initiation of the soft-start period are merely for illustrative purposes and should not be construed as limiting.

In response to receiving the soft-start signal 220, the microcontroller 202 can generate a first controlled voltage signal 222 having a first voltage level (e.g., a relatively high voltage level). The first controlled voltage signal 222 is provided to the DAC 204. The first controlled voltage signal 222 can be generated by the microcontroller 202 (and provided to the DAC 204) for a particular period of time (e.g., the soft-start time period) after the microcontroller 202 receives (or generates) the soft-start signal 220. The DAC 204 can be configured to convert the first controlled voltage signal 222 from a digital signal into an analog signal. For example, the DAC 204 can perform a digital-to-analog conversion on the first controlled voltage signal 222 to generate a first controlled analog voltage signal 224 having the first voltage level. The first controlled analog voltage signal 224 is provided as an input of the analog voltage controlled oscillator 206.

The analog voltage controlled oscillator 206 can be configured to generate the first gate drive signal 178A (e.g., an oscillating, or pulse width modulated (PWM), signal) based on the first controlled analog voltage signal 224. The first frequency 190 of the first gate drive signal 178A is based on the first voltage level of the first controlled analog voltage signal 224. For example, because the first voltage level of the first controlled analog voltage signal 224 is relatively high, the first gate drive signal 178A can oscillate at the relatively high frequency 190 (e.g., the soft-start frequency). The first gate drive signal 178A is provided to the switching circuit 140 of FIG. 1 and to the logic inverter 208.

Although FIG. 3A illustrates providing the first controlled analog voltage signal 224 to the analog voltage controlled oscillator 206, in other implementations, a digital signal (e.g., a digital high/low signal) can be provided to a voltage controlled oscillator to generate the first gate drive signal 178A. In these implementations, operations associated with the microcontroller 202 and the DAC 204 can be bypassed and the voltage controlled oscillator can generate the first gate drive signal 178A based on a logic level associated with the input digital signal.

The logic inverter 208 can be configured to perform an inverting operation on the first gate drive signal 178A to generate the first gate drive signal 178B. Thus, the first gate drive signal 178B is a complementary signal to the first gate drive signal 178A. The first gate drive signal 178B is also provided to the switching circuit 140 of FIG. 1.

Thus, the control circuit 170A of FIG. 3A enables the generation of the first gate drive signals 178 that drive the soft-start of the LLC resonant power converter 100 of FIG. 1. By generating the first gate drive signals 178A that drive the soft-start of the LLC resonant power converter 100, the LLC resonant power converter 100 operates at a relatively high frequency 190 during startup such that the gain of the rotary power transformer 154 is reduced as the output capacitor 136 charges. As a result, current on the secondary side of the LLC resonant power converter 100 is reduced and the likelihood of circuit components tripping during startup is reduced.

Figure 3B:
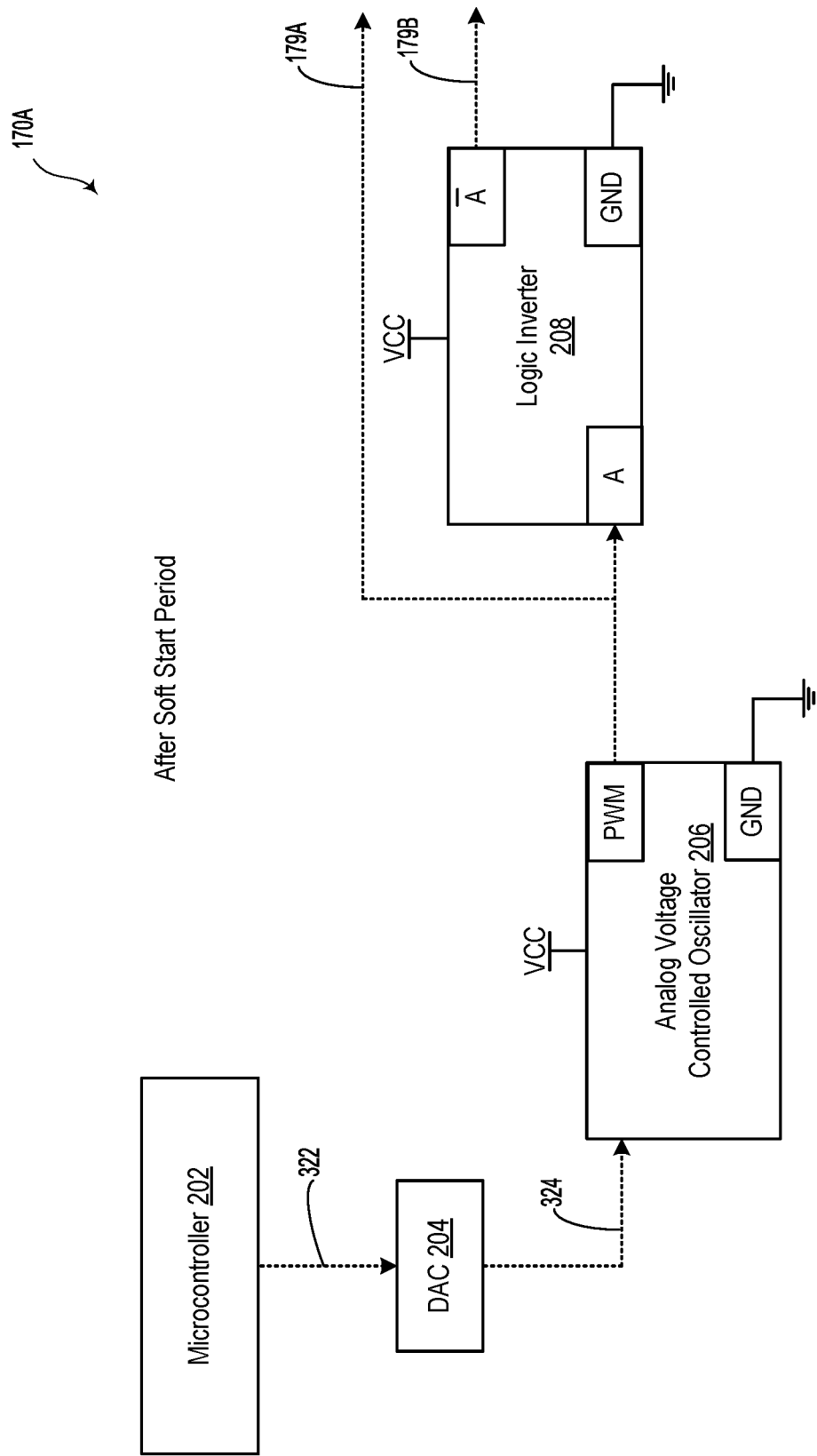
FIG. 3B is a block diagram of a control circuit that generates gate drive signals for an LLC resonant power converter after a soft-start period, according to example embodiments.

FIG. 3B is a block diagram of a control circuit 170A that generates gate drive signals for an LLC resonant power converter after a soft-start period, according to an example embodiment. In the illustration of FIG. 3B, the control circuit 170A is configured to generate the second gate drive signals 179A, 179B (having the second frequency 192) after the soft-start period for the LLC resonant power converter 100.

After expiration of the soft-start period, the microcontroller 202 can generate a second controlled voltage signal 322 having a second voltage level (e.g., a relatively low voltage level). The second controlled voltage signal 322 is provided to the DAC 204. The DAC 204 can be configured to convert the second controlled voltage signal 322 from a digital signal into an analog signal. For example, the DAC 204 can perform a digital-to-analog conversion on the second controlled voltage signal 322 to generate a second controlled analog voltage signal 324 having the second voltage level. The second controlled analog voltage signal 324 is provided to an input of the analog voltage controlled oscillator 206.

The analog voltage controlled oscillator 206 can be configured to generate the second gate drive signal 179A (e.g., an oscillating, or PWM, signal) based on the second controlled analog voltage signal 324. The second frequency 192 of the second gate drive signal 179A generated by the analog voltage controlled oscillator 206 is based on the second voltage level of the second controlled analog voltage signal 324. For example, because the second voltage level of the second controlled analog voltage signal 324 is relatively low compared to the first voltage level of the first controlled analog voltage signal 224, the second gate drive signal 179A can oscillate at the relatively low frequency 192 (e.g., the target frequency). The second gate drive signal 179A is provided to the switching circuit 140 of FIG. 1 and to the logic inverter 208.

Although FIG. 3B illustrates providing the second controlled analog voltage signal 324 to the analog voltage controlled oscillator 206, in other implementations, a digital signal (e.g., a digital high/low signal) can be provided to a voltage controlled oscillator to generate the second gate drive signal 178B. In these implementations, operations associated with the microcontroller 202 and the DAC 204 can be bypassed and the voltage controlled oscillator can generate the second gate drive signal 178B based on a logic level associated with the input digital signal.

The logic inverter 208 can be configured to perform an inverting operation on the second gate drive signal 179A to generate the second gate drive signal 179B. Thus, the second gate drive signal 179B is a complementary signal to the second gate drive signal 179A. The second gate drive signal 179B is also provided to the switching circuit 140 of FIG. 1.

Thus, the control circuit 170A of FIG. 3B enables the generation of the second gate drive signals 179 that drive normal operation of the LLC resonant power converter 100 after the soft-start period expires. For example, after the soft-start period expires and the output capacitor 136 has sufficiently charged to reduce the likelihood of circuit components tripping, the control circuit 170A can generate the second gate drive signals 179 to operate the LLC resonant power converter 100 at a target frequency.

Figure 4:
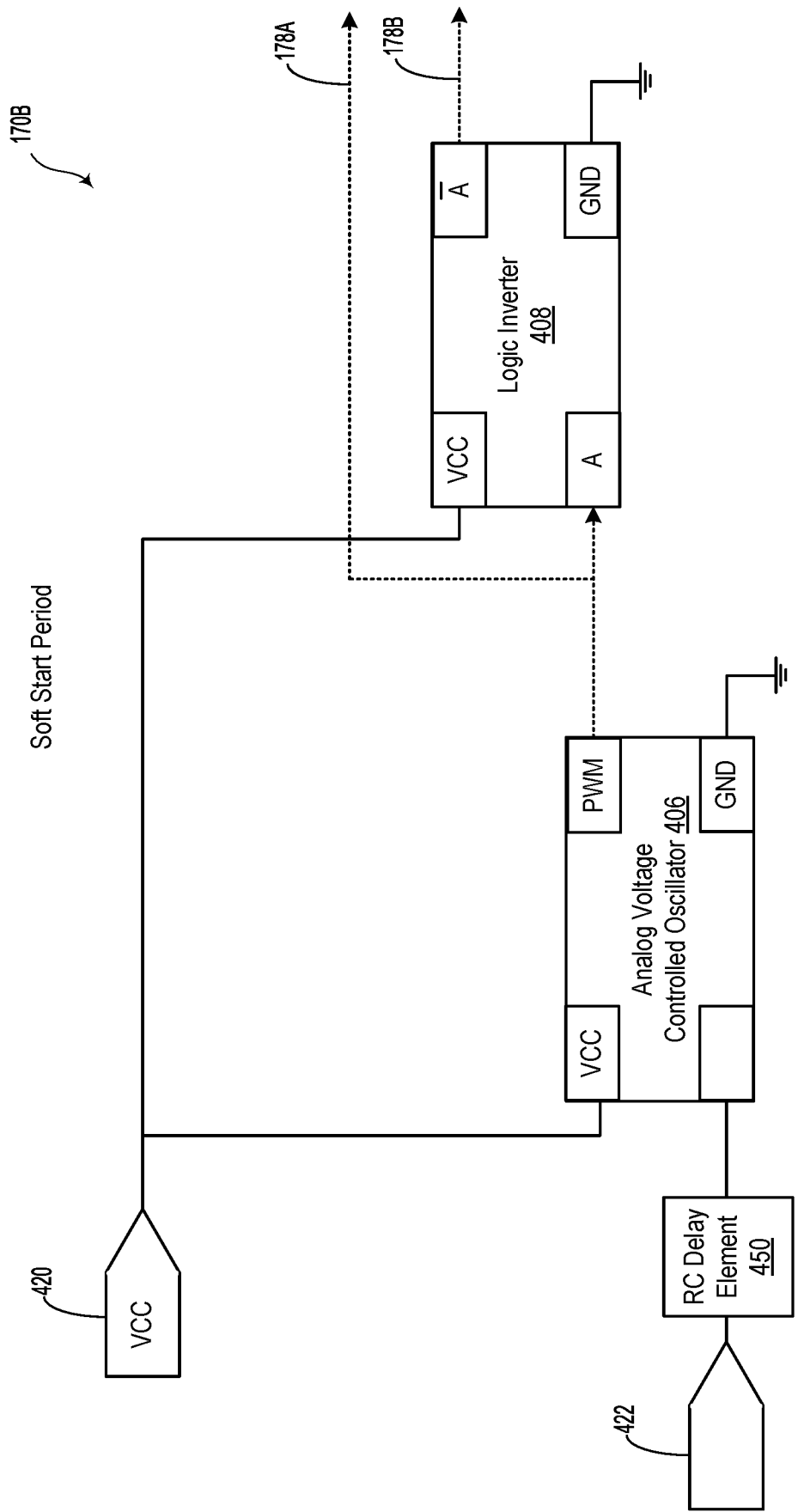
FIG. 4 is another block diagram of a control circuit that generates gate drive signals for an LLC resonant power converter during a soft-start period, according to example embodiments.

FIG. 4 is another block diagram of a control circuit 170B that generates gate drive signals for an LLC resonant power converter during a soft-start period, according to an example embodiment. The control circuit 170B can correspond to the control circuit 170 of FIG. 1. The control circuit 170B includes an analog voltage controlled oscillator 406, a logic inverter 408, and a resistive-capacitive (RC) delay element 450. In some implementations, the analog voltage controlled oscillator 406 can correspond to the oscillator 182 of FIG. 1. In the illustration of FIG. 4, the control circuit 170B is configured to generate the first gate drive signals 178A, 178B during the soft-start period for the LLC resonant power converter 100.

A supply voltage (VCC) 420 is applied to the analog voltage controlled oscillator 406 and to the logic inverter 408. To initiate a soft-start period for the LLC resonant power converter 100, a soft-start signal 422 provided to the analog voltage controlled oscillator 406 can transition to a logical low voltage level (e.g., be "pulled low"). In response to transitioning the soft-start signal 422 to the logical low voltage level, the analog voltage controlled oscillator 406 can generate the first gate drive signal 178A. The first gate drive signal 178A is provided to the switching circuit 140 of FIG. 1 and to the logic inverter 408. The length of the soft-start period can be controlled by the RC delay element 450. For example, the delay associated with the logical low voltage level of the soft-start signal 422 is based on a capacitance in the RC delay element 450.

The logic inverter 408 can be configured to perform an inverting operation on the first gate drive signal 178A to generate the first gate drive signal 178B. Thus, the first gate drive signal 178B is a complementary signal to the first gate drive signal 178A. The first gate drive signal 178B is also provided to the switching circuit 140 of FIG. 1.

Thus, the control circuit 170B of FIG. 4 enables the generation of the first gate drive signals 178 that trigger the soft-start of the LLC resonant power converter 100 of FIG. 1. By generating the first gate drive signals 178A that trigger the soft-start of the LLC resonant power converter 100, the LLC resonant power converter 100 operates at a relatively high frequency 190 during startup such that the gain of the rotary power transformer 154 is reduced as the output capacitor 136 charges. As a result, current on the secondary side of the LLC resonant power converter 100 is reduced and the likelihood of circuit components tripping during startup is reduced.

Figure 5:
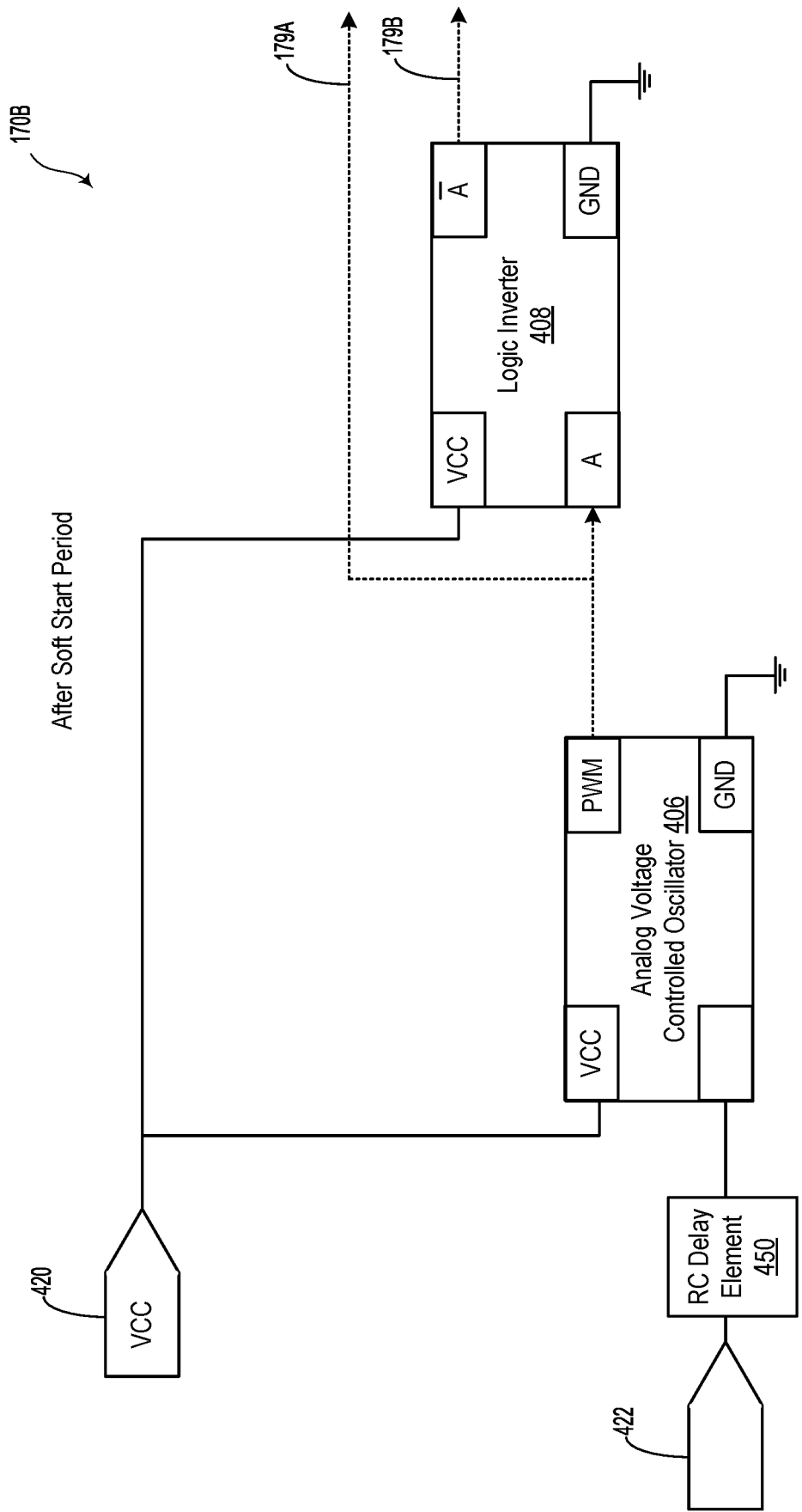
FIG. 5 is another block diagram of a control circuit that generates gate drive signals for an LLC resonant power converter after a soft-start period, according to example embodiments.

FIG. 5 is a block diagram of the control circuit 170B that generates gate drive signals for an LLC resonant power converter after a soft-start period, according to an example embodiment. In the illustration of FIG. 5, the control circuit 170B is configured to generate the second gate drive signals 179A, 179B after the soft-start period for the LLC resonant power converter 100.

After expiration of the soft-start period for the LLC resonant power converter 100 (e.g., after the delay associated with the RC delay element 450), the analog voltage controlled oscillator 406 can be configured to generate the second gate drive signal 179A. The second gate drive signal 179A is provided to the switching circuit 140 of FIG. 1 and to the logic inverter 408. The logic inverter 408 can be configured to perform an inverting operation on the second gate drive signal 179A to generate the second gate drive signal 179B. Thus, the second gate drive signal 179B is a complementary signal to the second gate drive signal 179A. The second gate drive signal 179B is also provided to the switching circuit 140 of FIG. 1.

Thus, the control circuit 170B of FIG. 5 enables the generation of the second gate drive signals 179 that drive normal operation of the LLC resonant power converter 100 after the soft-start period expires. For example, after the soft-start period expires and the output capacitor 136 has sufficiently charged to reduce the likelihood of circuit components tripping, the control circuit 170B can generate the second gate drive signals 179 to operate the LLC resonant power converter 100 at a target frequency.

Figure 6:
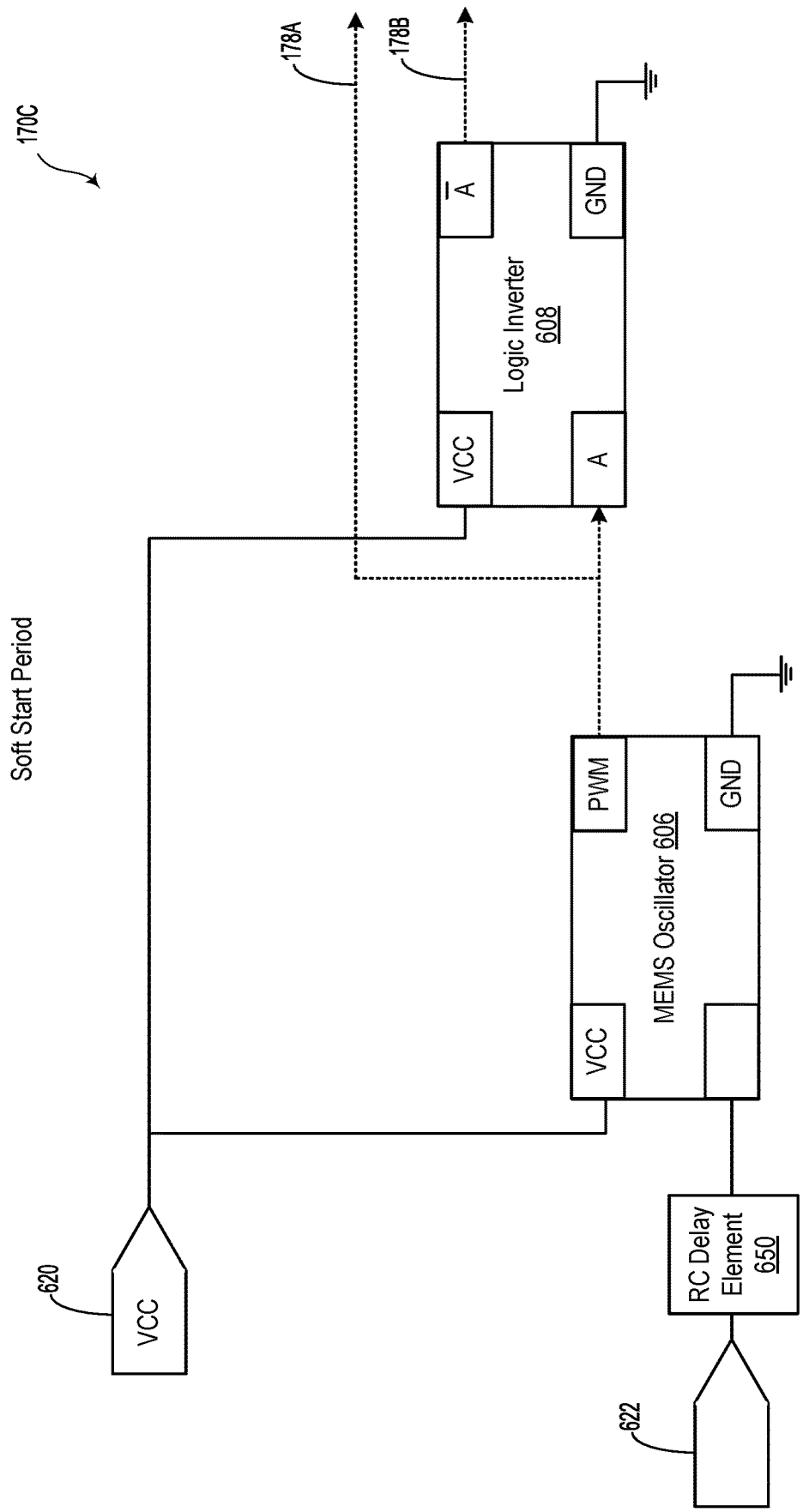
FIG. 6 is another block diagram of a control circuit that generates gate drive signals for an LLC resonant power converter during a soft-start period, according to example embodiments.

FIG. 6 is another block diagram of a control circuit 170C that generates gate drive signals for an LLC resonant power converter during a soft-start period, according to an example embodiment. The control circuit 170C can correspond to the control circuit 170 of FIG. 1. The control circuit 170C includes a microelectromechanical system (MEMS) oscillator 606, a logic inverter 608, and a RC delay element 650. In some implementations, the MEMS oscillator 606 can correspond to the oscillator 182 of FIG. 1. In the illustration of FIG. 4, the control circuit 170C is configured to generate the first gate drive signals 178A, 178B during the soft-start period for the LLC resonant power converter 100.

A supply voltage (VCC) 620 is applied to the MEMS oscillator 606 and to the logic inverter 608. To initiate a soft-start period, a soft-start signal 622 provided to the MEMS oscillator 606 can transition to a logical low voltage level (e.g., be "pulled low"). In response to transitioning the soft-start signal 622 to the logical low voltage level, the MEMS oscillator 606 can generate the first gate drive signal 178A having the first frequency 190. For example, in some implementations, the MEMS oscillator 606 can have a discrete number of frequency settings. To illustrate, the MEMS oscillator 606 can have a frequency setting for the first frequency 190 and a frequency setting for the second frequency 192. Each frequency setting can be selectively activated using a digital pin. In response to transitioning the soft-start signal 622 to the logical low voltage level, the frequency setting for the first frequency 190 can be activated and the MEMS oscillator 606 can generate the first gate drive signal 178A. The first gate drive signal 178A is provided to the switching circuit 140 of FIG. 1 and to the logic inverter 608. The length of the soft-start period can be controlled by the RC delay element 650. For example, the delay associated with the logical low voltage level of the soft-start signal 622 is based on a capacitance in the RC delay element 650.

The logic inverter 408 can be configured to perform an inverting operation on the first gate drive signal 178A to generate the first gate drive signal 178B. Thus, the first gate drive signal 178B is a complementary signal to the first gate drive signal 178A. The first gate drive signal 178B is also provided to the switching circuit 140 of FIG. 1.

Thus, the control circuit 170C of FIG. 6 enables the generation of the first gate drive signals 178 that trigger the soft-start of the LLC resonant power converter 100 of FIG. 1. By generating the first gate drive signals 178A that trigger the soft-start of the LLC resonant power converter 100, the LLC resonant power converter 100 operates at a relatively high frequency 190 during startup such that the gain of the rotary power transformer 154 is reduced as the output capacitor 136 charges. As a result, current on the secondary side of the LLC resonant power converter 100 is reduced and the likelihood of circuit components tripping during startup is reduced.

Figure 7:
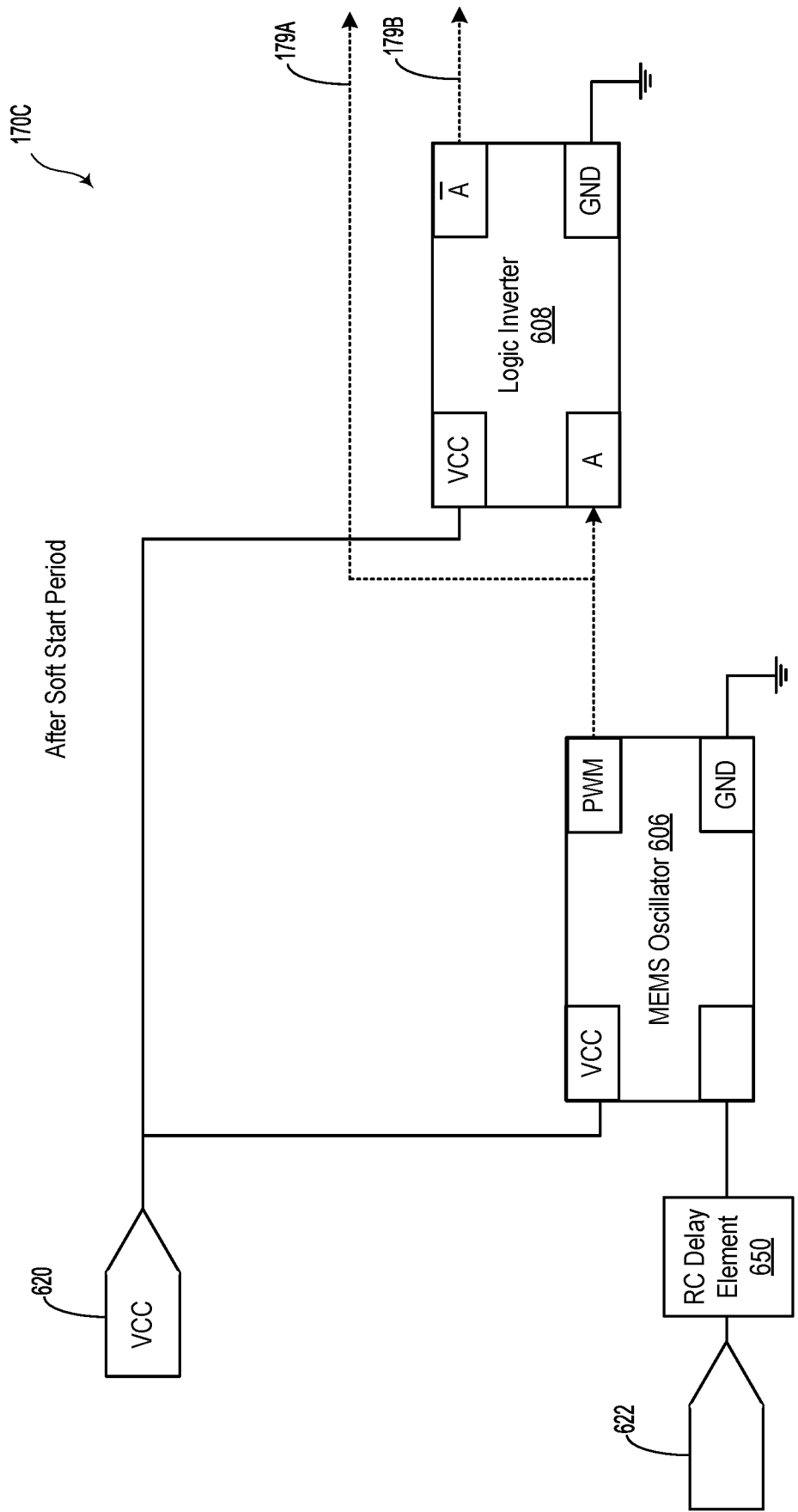
FIG. 7 is another block diagram of a control circuit that generates gate drive signals for an LLC resonant power converter after a soft-start period, according to example embodiments.

FIG. 7 is a block diagram of the control circuit 170C that generates gate drive signals for an LLC resonant power converter after a soft-start period, according to an example embodiment. In the illustration of FIG. 7, the control circuit 170C is configured to generate the second gate drive signals 179A, 179B after the soft-start period for the LLC resonant power converter 100.

After expiration of the soft-start period for the LLC resonant power converter 100 (e.g., after the delay associated with the RC delay element 650), the MEMS oscillator 606 can be configured to generate the second gate drive signal 179A. For example, after the delay associated with the RC delay element 650, the frequency setting for the second frequency 192 can be activated and the MEMS oscillator 606 can generate the second gate drive signal 179A. The second gate drive signal 179A is provided to the switching circuit 140 of FIG. 1 and to the logic inverter 408. The logic inverter 408 can be configured to perform an inverting operation on the second gate drive signal 179A to generate the second gate drive signal 179B. Thus, the second gate drive signal 179B is a complementary signal to the second gate drive signal 179A. The second gate drive signal 179B is also provided to the switching circuit 140 of FIG. 1.

Thus, the control circuit 170C of FIG. 7 enables the generation of the second gate drive signals 179 that drive normal operation of the LLC resonant power converter 100 after the soft-start period expires. For example, after the soft-start period expires and the output capacitor 136 has sufficiently charged to reduce the likelihood of circuit components tripping, the control circuit 170B can generate the second gate drive signals 179 to operate the LLC resonant power converter 100 at a target frequency.

Figure 8:
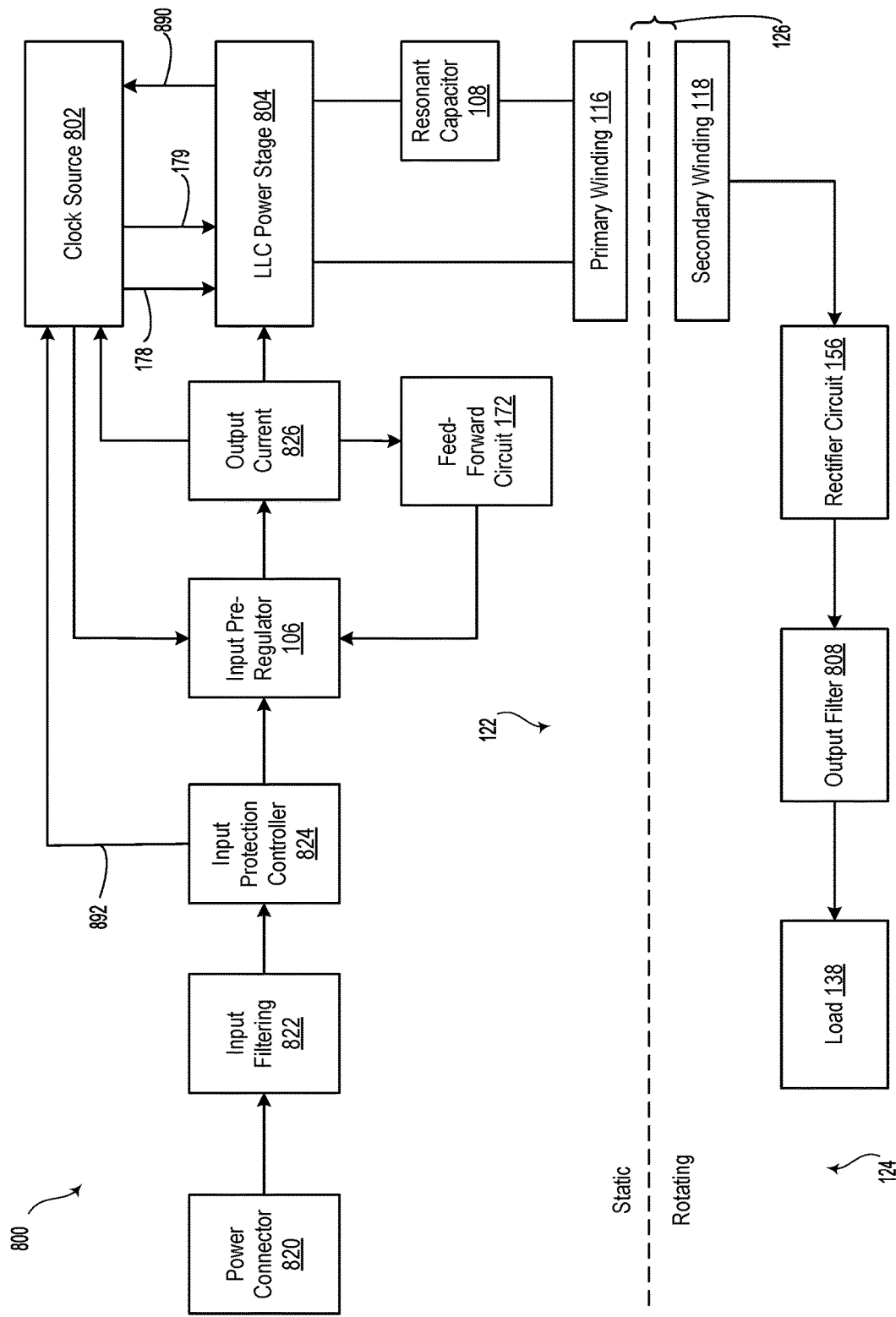
FIG. 8 is a block diagram of an LLC resonant power converter, according to example embodiments.

FIG. 8 is a block diagram of an LLC resonant power converter 800, according to an example embodiment. The LLC resonant power converter 800 includes a clock source 802, an LLC power stage 804, the resonant capacitor 108, the primary winding 116, the secondary winding 118, the rectifier circuit 156, an output filter 808, and the load 138. The LLC resonant power converter 800 can correspond to the LLC resonant power converter 100 of FIG. 1.

The clock source 802 can correspond to the oscillator 182, the microcontroller 184, the crystal 186, or the timing circuit 188 of FIG. 1. In some embodiments, the clock source 802 can operate in a substantially similar manner as the control circuit 170 described with respect to FIGS. 1-7. For example, the clock source 802 can be configured to generate the first gate drive signals 178 to soft start the LLC resonant power converter 800 at the higher frequency 190 and, after the soft start period, the clock source can be configured to generate the second gate drive signals 179 to operate the LLC resonant power converter 800 at the lower frequency 192.

The LLC power stage 804 can correspond to the power converter driver 150 of FIG. 1. For example, in response to receiving the gate drive signals 178, 179 from the clock source 802, the LLC power stage 804 can drive the wireless power signal 180A, 180B at the primary winding 116 via the resonant capacitor 108. A resulting wireless power signal 180C, 180D can be driven at the secondary winding 118, via electromagnetic induction. The resulting wireless power signal 180C, 180D can power the load 138 via the rectifier circuit 156 and the output filter 808.

As illustrated in FIG. 8, a fault signal 890 can be provided to the clock source 802. The fault signal 890 can indicate the occurrence of a condition that triggers the soft start operation. For example, the fault signal 890 can be generated and provided to the clock source 802 in response to detecting a fault at the LLC resonant power converter 800. For example, if a circuit component associated with the LLC resonant power converter 800 trips, the fault signal 890 can be provided to the clock source 802 to initiate a restart of the LLC resonant power converter 800. The clock source 802 can restart the LLC resonant power converter 800 by driving the first gate drive signals 178 (having the first frequency 190) at the LLC power stage 804 during the soft start period.

Additionally, as illustrated in FIG. 8, the clock source 802, the LLC power stage 804, the resonant capacitor 108, and the primary winding 116 are disposed on the first platform 122. The secondary winding 118, the rectifier circuit 156, the output filter 808, and the load 138 are disposed on the second platform 124. The first platform 122 and the second platform 124 are separated by the gap 126 between the windings 116, 806 of the rotary power transformer. The first platform 122 can be static or stationary, and the second platform 124 can rotate relative to the first platform 122.

The LLC resonant power converter 800 also includes a power connector 820, input filtering 822, an input protection controller 824, and the pre-regulator 106. The power connector 820, the input filtering 822, the input protection controller 824, and the pre-regulator 106 can be disposed on the first platform 122. The power connector 820 can couple the LLC resonant power converter 800 to a power supply, and the power can be regulated using the input filtering 822.

According to one implementation, the input protection controller 824 can be configured to generate a fault signal 892 to trigger the soft start of the LLC resonant power converter 800. For example, in response to detecting a fault at the LLC resonant power converter 800, the input protection controller 824 can generate the fault signal 892 to initiate a soft start (e.g., a restart) of the LLC resonant power converter 800. For example, if a circuit component associated with the LLC resonant power converter 100 trips, input protection controller 824 can provide the fault signal 892 to the clock source 802 to initiate operation of (e.g., restart) the LLC resonant power converter 100. In another implementation, the input protection controller 824 can provide the fault signal 892 to the clock source 802 in response to detecting a command to activate a device mounted on the second platform 124, such as the LIDAR device 1010. It should be understood that above scenarios for triggering the initiation of the soft-start period are merely for illustrative purposes and should not be construed as limiting. In other implementations, the fault detected by the input protection controller 824 can include detection of an over voltage, detection of an under voltage, detection of an over current, etc. If the input protection controller 824 detects one or more of these faults, operation of the LIDAR device 1010 can be stopped and the soft start sequence of the LLC resonant power converter 800 can be restarted.

The input pre-regulator 106 can be configured to generate an output current 826. The output current 826 can correspond to the feed-forward current 194. The feed-forward circuit 172 can determine (e.g., measure) the output current 826. Based on the feed-forward current, a voltage applied to the LLC power stage 804 can be adjusted. For example, the voltage applied to the LLC power stage 804 can be increased or decreased to soft-start the LLC resonant power converter 100.

For example, the output current 826 can be applied to the gate drive signals 178, 179 to adjust the input voltage to the LLC power stage 804 and/or to adjust the frequency of the gate drive signals 178, 179. In some implementations, the feed-forward circuit 172 (e.g., a feed-forward amplifier circuit) can monitor (e.g., sample) the output current 826 and provide a control signal to the input pre-regulator 106 to adjust the output current 826 for LLC gain control.

In some implementations, an output voltage of the pre-regulator 106 can be adjusted to create a voltage ramp at the input of the LLC power stage 804 to soft start the rotary power link. For example, the clock source 802 can include logic to program or change the output voltage of the pre-regulator 106 via a digital communications bus or an analog signal to the feedback network. To illustrate, in some implementations, the clock source 802 can correspond to a microcontroller, such as the microcontroller 184. In these implementations, the clock source 802 can use a digital communications bus to program the pre-regulator 106 to create a slow voltage ramp at the input of the LLC power stage 804.

Figure 9:
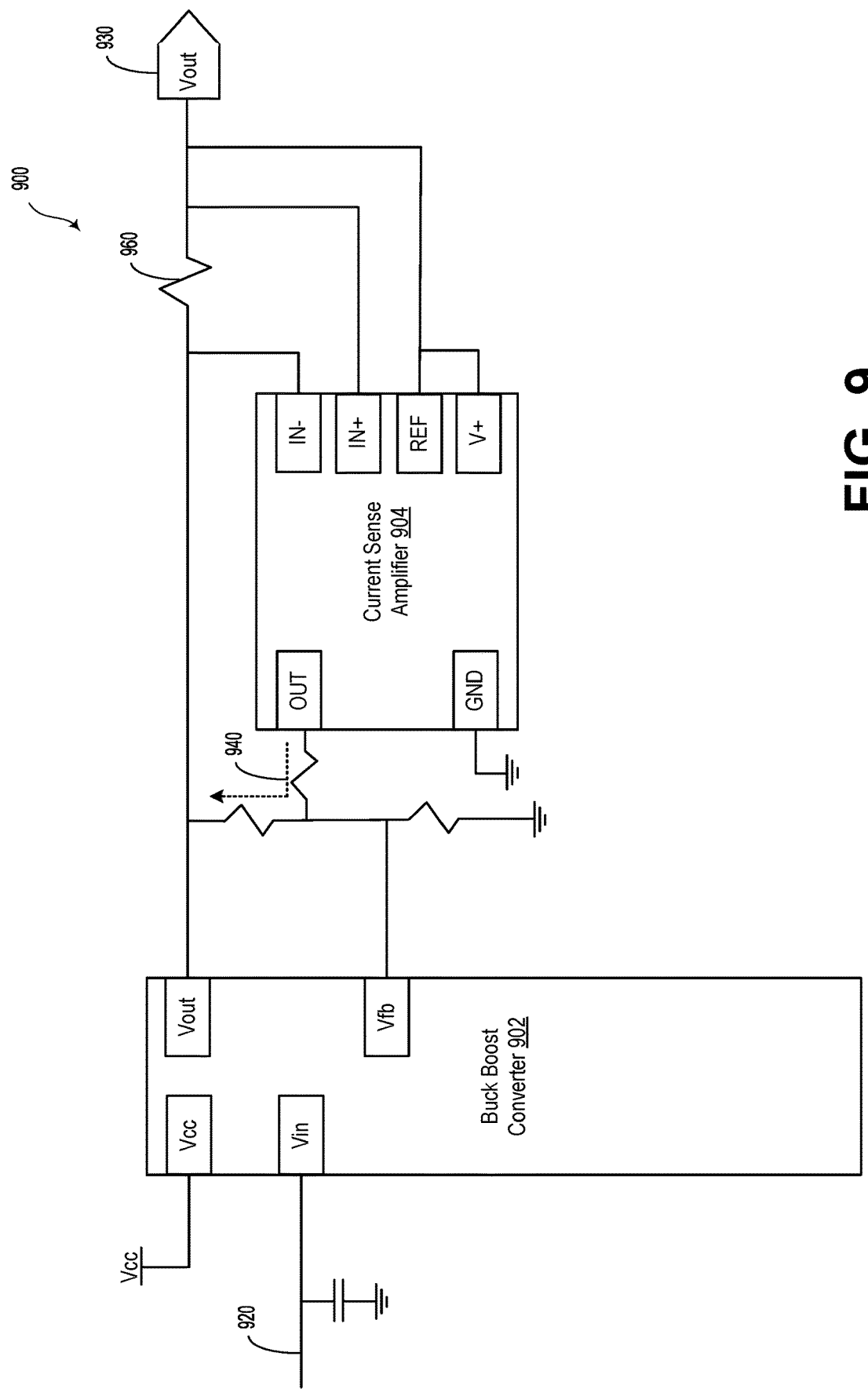
FIG. 9 is a diagram of a pre-regulator circuit, according to example embodiments.

FIG. 9 is a diagram of a pre-regulator circuit 900, according to an example embodiment. According to one implementation, the pre-regulator circuit 900 can correspond to the pre-regulator 106.

The pre-regulator circuit 900 includes a buck boost converter 902 and a current sense amplifier 904. A supply voltage (Vcc) is provided to a supply voltage input of the buck boost converter 902 to power the buck boost converter 902. An input voltage 920 is provided to a voltage input (Vin) of the buck boost converter 902. The buck boost converter 902 can be configured to perform a voltage step-up operation or a voltage step-down operation to generate an output voltage (Vout) 930 based on the input voltage 920.

The current sense amplifier 904 can be configured to bias a feedback (Vfb) network associated with the pre-regulator circuit 900 to adjust the output voltage 930 based on a load current. For example, the current sense amplifier 904 can sample a voltage at a first terminal of a load 960 and can sample a voltage at a second terminal of the load 960 to determine a voltage across the load 960. Based on the voltage across the load 960, the current sense amplifier 904 can generate a feedback signal 940 to bias the feedback network and adjust the output voltage 930. Thus, the current sense amplifier 904 can be used to compensate for the open-loop regulation characteristics of the LLC resonant power converter 100. For example, a drop in the secondary output voltage (e.g., a voltage across the load 138 of FIG. 1) can be compensated by raising the input voltage provided to the LLC resonant power converter 100 (e.g., raising the output voltage 930 of the pre-regulator circuit 900).

Adjusting the output voltage 930 (e.g., the voltage provided to the LLC resonant power converter 100) can reduce the output voltage of the LLC resonant power converter 100, and therefore can reduce current spikes during startup. As a result, current on the secondary side of the LLC resonant power converter 100 is reduced and the likelihood of circuit components tripping during startup is reduced.

Additionally, although a buck/boost topology (e.g., the buck boost converter 902) is illustrated, in other implementations, the pre-regulator circuit 900 can include any switch mode power supply (SMPS) topology that raises or lowers the input voltage to the LLC resonant power converter 100. As a non-limiting example, in some embodiments, the pre-regulator circuit 900 can include a boost topology that is used to raise or lower the input voltage to the LLC resonant power converter 100. Thus, in these embodiments, the buck boost converter 902 can be replaced with boost circuitry to raise or lower the input voltage to the LLC resonant power converter 100.

Figure 10A:
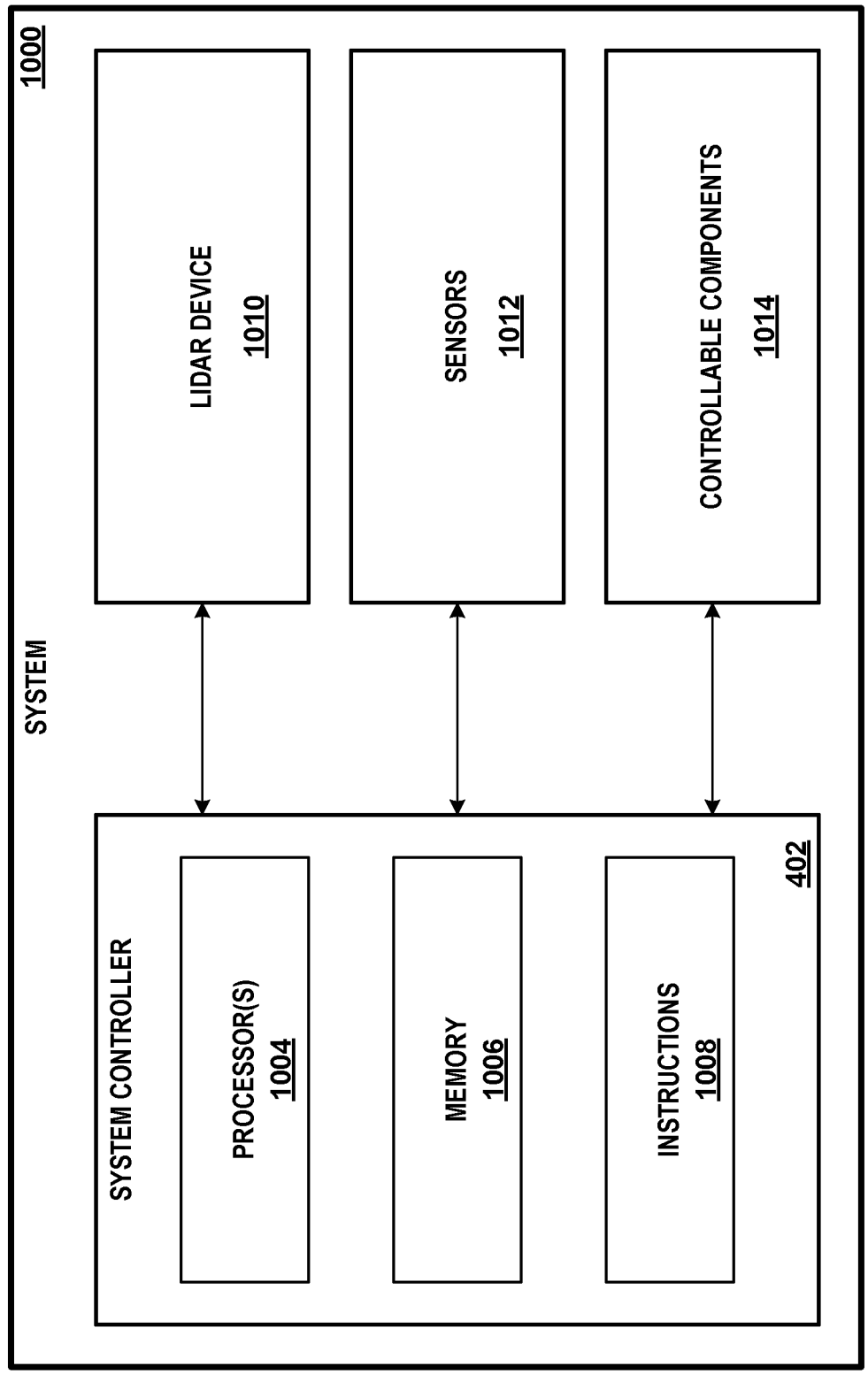
FIG. 10A is a block diagram of a system including a LIDAR device, according to example embodiments.

FIG. 10A is a block diagram of a system, according to example embodiments. In particular, FIG. 10A shows a system 1000 that includes a system controller 1002, a LIDAR device 1010, a plurality of sensors 1012, and a plurality of controllable components 1014. The system controller 1002 includes a processor(s) 1004, a memory 1006, and instructions 1008 stored on the memory 1006 and executable by the processor(s) 1004 to perform functions.

The processor(s) 1004 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 1006 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The LIDAR device 1010, described further below, includes a plurality of light emitters configured to emit light (e.g., in light pulses) and one or more light detectors configured to detect light (e.g., reflected portions of the light pulses). The LIDAR device 1010 may generate three-dimensional (3D) point cloud data from outputs of the light detector(s), and provide the 3D point cloud data to the system controller 1002. The system controller 1002, in turn, may perform operations on the 3D point cloud data to determine the characteristics of a surrounding environment (e.g., relative positions of objects within a surrounding environment, edge detection, object detection, and proximity sensing).

Similarly, the system controller 1002 may use outputs from the plurality of sensors 1012 to determine the characteristics of the system 1000 and/or characteristics of the surrounding environment. For example, the sensors 1012 may include one or more of a GPS, an IMU, an image capture device (e.g., a camera), a light sensor, a heat sensor, and other sensors indicative of parameters relevant to the system 1000 and/or the surrounding environment. The LIDAR device 1010 is depicted as separate from the sensors 1012 for purposes of example, and may be considered as part of or as the sensors 1012 in some examples.

Based on characteristics of the system 1000 and/or the surrounding environment determined by the system controller 1002 based on the outputs from the LIDAR device 1010 and the sensors 1012, the system controller 1002 may control the controllable components 1014 to perform one or more actions. For example, the system 1000 may correspond to a vehicle, in which case the controllable components 1014 may include a braking system, a turning system, and/or an accelerating system of the vehicle, and the system controller 1002 may change aspects of these controllable components based on characteristics determined from the LIDAR device 1010 and/or the sensors 1012 (e.g., when the system controller 1002 controls the vehicle in an autonomous or semi-autonomous mode). Within examples, the LIDAR device 1010 and the sensors 1012 are also controllable by the system controller 1002.

Figure 10B:
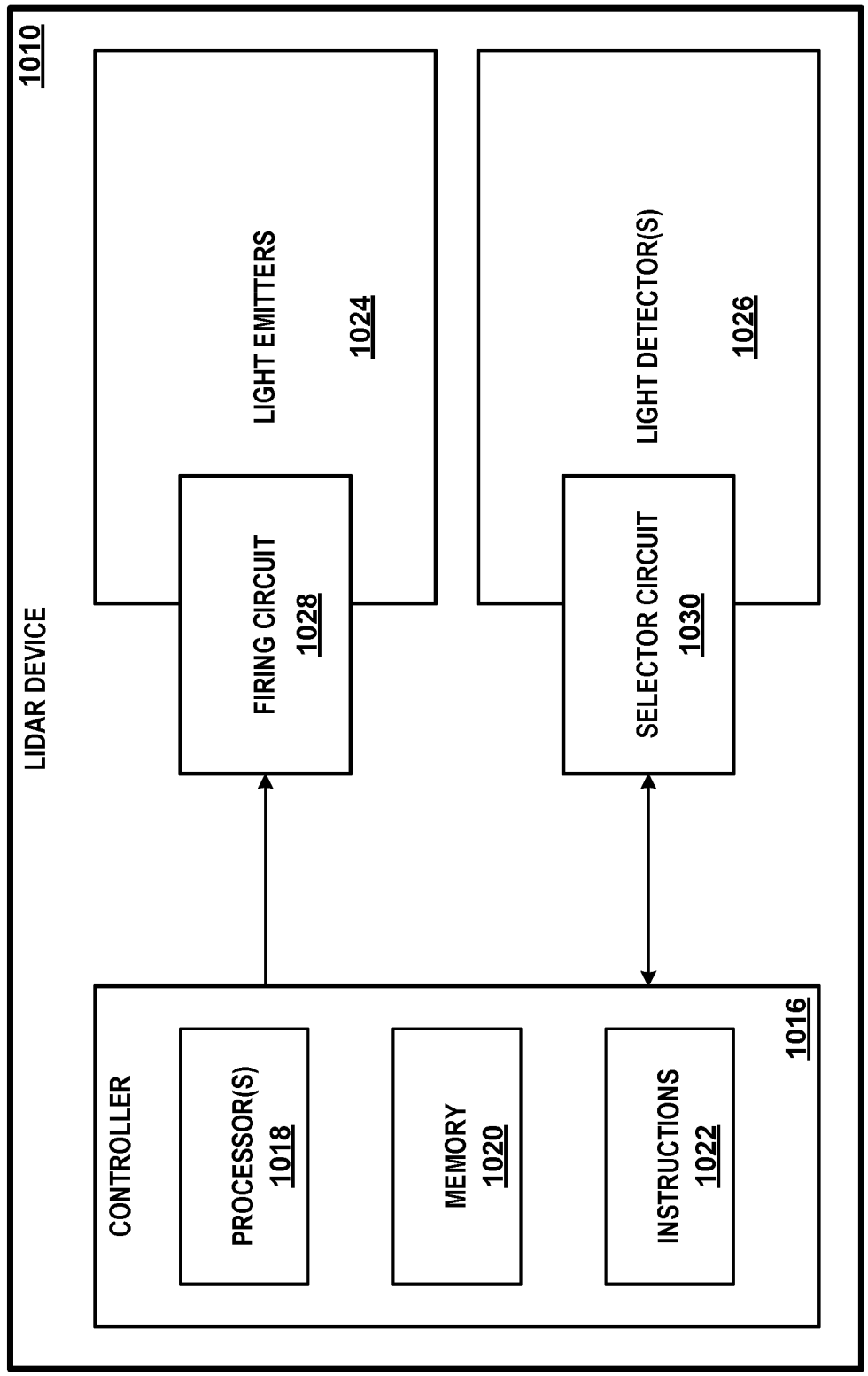
FIG. 10B is a block diagram of a LIDAR device, according to example embodiments.

FIG. 10B is a block diagram of a LIDAR device, according to an example embodiment. In particular, FIG. 10B shows a LIDAR device 1010, having a controller 1016 configured to control a plurality of light emitters 1024 and one or more light detector(s), e.g., a plurality of light detectors 1026, etc. The LIDAR device 1010 further includes a firing circuit 1028 configured to select and provide power to respective light emitters of the plurality of light emitters 1024 and may include a selector circuit 1030 configured to select respective light detectors of the plurality of light detectors 1026. The controller 1016 includes a processor(s) 1018, a memory 1020, and instructions 1022 stored on the memory 1020.

Similar to processor(s) 1004, the processor(s) 1018 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to the memory 1006, the memory 1020 may include a computer-readable medium, such as a non-transitory, computer-readable medium, such as, but not limited to, ROM, PROM, EPROM, EEPROM, non-volatile random-access memory (e.g., flash memory), a SSD, a HDD, a CD, a DVD, a digital tape, R/W CDs, R/W DVDs, etc.

The instructions 1022 are stored on the memory 1020 and executable by the processor(s) 1018 to perform functions related to controlling the firing circuit 1028 and the selector circuit 1030, for generating 3D point cloud data, and for processing the 3D point cloud data (or perhaps facilitating processing the 3D point cloud data by another computing device, such as the system controller 1002).

The controller 1016 can determine 3D point cloud data by using the light emitters 1024 to emit pulses of light. A time of emission is established for each light emitter and a relative location at the time of emission is also tracked. Aspects of a surrounding environment of the LIDAR device 1010, such as various objects, reflect the pulses of light. For example, when the LIDAR device 1010 is in a surrounding environment that includes a road, such objects may include vehicles, signs, pedestrians, road surfaces, or construction cones. Some objects may be more reflective than others, such that an intensity of reflected light may indicate a type of object that reflects the light pulses. Further, surfaces of objects may be at different positions relative to the LIDAR device 1010, and thus take more or less time to reflect portions of light pulses back to the LIDAR device 1010. Accordingly, the controller 1016 may track a detection time at which a reflected light pulse is detected by a light detector and a relative position of the light detector at the detection time. By measuring time differences between emission times and detection times, the controller 1016 can determine how far the light pulses travel prior to being received, and thus a relative distance of a corresponding object. By tracking relative positions at the emission times and detection times the controller 1016 can determine an orientation of the light pulse and reflected light pulse relative to the LIDAR device 1010, and thus a relative orientation of the object. By tracking intensities of received light pulses, the controller 1016 can determine how reflective the object is. The 3D point cloud data determined based on this information may thus indicate relative positions of detected reflected light pulses (e.g., within a coordinate system, such as a Cartesian coordinate system) and intensities of each reflected light pulse.

The firing circuit 1028 is used for selecting light emitters for emitting light pulses. The selector circuit 1030 similarly is used for sampling outputs from light detectors.

FIGS. 11A-11E show an example vehicle 1100 (e.g., a fully autonomous vehicle or semi-autonomous vehicle). Although the vehicle 1100 is illustrated in FIGS. 11A-11E as a van with side view mirrors for illustrative purposes, the present disclosure is not so limited. For instance, the vehicle 1100 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

The example vehicle 1100 may include one or more sensor systems 1102, 1104, 1106, 1108, 1110, 1112, 1114, and 1118. The sensor systems 1102, 1104, 1106, 1108, 1110, 1112, 1114, and 1118 can be powered using the LLC resonant power converter 100 of FIG. 1. In some embodiments, the sensor systems 1102, 1104, 1106, 1108, 1110, 1112, 1114, and/or 1118 could represent one or more optical systems (e.g. cameras), one or more LIDARs, one or more radars, one or more inertial sensors, one or more humidity sensors, one or more acoustic sensors (e.g., microphones and sonar devices), or one or more other sensors configured to sense information about an environment surrounding the vehicle 1100. In other words, any sensor system now known or later created could be coupled to the vehicle 1100 and/or could be utilized in conjunction with various operations of the vehicle 1100. As an example, a LIDAR could be utilized in self-driving or other types of navigation, planning, perception, and/or mapping operations of the vehicle 1100. In addition, the sensor systems 1102, 1104, 1106, 1108, 1110, 1112, 1114, and/or 1118 could represent a combination of sensors described herein (e.g., one or more LIDARs and radars; one or more LIDARs and cameras; one or more cameras and radars; or one or more LIDARs, cameras, and radars).

Note that the number, location, and type of sensor systems (e.g., 1102 and 1104) depicted in FIGS. 11A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, or to adapt to specialized environmental or application circumstances). For example, the sensor systems (e.g., 1102 and 1104) could be disposed in various other locations on the vehicle (e.g., at location 1116) and could have fields of view that correspond to internal and/or surrounding environments of the vehicle 1100.

The sensor system 1102 may be mounted atop the vehicle 1100 and may include one or more sensors configured to detect information about an environment surrounding the vehicle 1100, and output indications of the information. For example, the sensor system 1102 can include any combination of cameras, radars, LIDARs, inertial sensors, humidity sensors, and acoustic sensors (e.g., microphones and sonar devices). The sensor system 1102 can include one or more movable mounts that could be operable to adjust the orientation of one or more sensors in the sensor system 1102. In one embodiment, the movable mount could include a rotating platform that could scan sensors so as to obtain information from each direction around the vehicle 1100. In another embodiment, the movable mount of the sensor system 1102 could be movable in a scanning fashion within a particular range of angles and/or azimuths and/or elevations. The sensor system 1102 could be mounted atop the roof of a car, although other mounting locations are possible.

Additionally, the sensors of sensor system 1102 could be distributed in different locations and need not be collocated in a single location. Furthermore, each sensor of sensor system 1102 can be configured to be moved or scanned independently of other sensors of sensor system 1102. Additionally or alternatively, multiple sensors may be mounted at one or more of the sensor locations 1102, 1104, 1106, 1108, 1110, 1112, 1114, and/or 1118. For example, there may be two LIDAR devices mounted at a sensor location and/or there may be one LIDAR device and one radar mounted at a sensor location.

The one or more of the sensor systems 1102, 1104, 1106, 1108, 1110, 1112, 1114, and/or 1118 could include one or more LIDAR devices. For example, the LIDAR devices could include a plurality of light-emitter devices arranged over a range of angles with respect to a given plane (e.g., the x-y plane). For example, one or more of the sensor systems 1102, 1104, 1106, 1108, 1110, 1112, 1114, and/or 1118 may be configured to rotate or pivot about an axis (e.g., the z-axis) perpendicular to the given plane so as to illuminate an environment surrounding the vehicle 1100 with light pulses. Based on detecting various aspects of reflected light pulses (e.g., the elapsed time of flight, polarization, and intensity), information about the surrounding environment may be determined.

In an example embodiment, the sensor systems 1102, 1104, 1106, 1108, 1110, 1112, 1114, and/or 1118 may be configured to provide respective point cloud information that may relate to physical objects within the surrounding environment of the vehicle 1100. While the vehicle 1100 and sensor systems 1102, 1104, 1106, 1108, 1110, 1112, 1114, and 1118 are illustrated as including certain features, it will be understood that other types of sensor systems are contemplated within the scope of the present disclosure.

In an example configuration, one or more radars can be located on the vehicle 1100. The one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of the vehicle 1100. For example, one or more of the sensor systems 1102, 1104, 1106, 1108, 1110, 1112, 1114, and/or 1118 could include one or more radars. In some examples, one or more radars can be located near the rear of the vehicle 1100 (e.g., the sensor systems 1108 and 1110), to actively scan the environment near the back of the vehicle 1100 for the presence of radio-reflective objects. Similarly, one or more radars can be located near the front of the vehicle 1100 (e.g., the sensor systems 1112 or 1114) to actively scan the environment near the front of the vehicle 1100. A radar can be situated, for example, in a location suitable to illuminate a region including a forward-moving path of the vehicle 1100 without occlusion by other features of the vehicle 1100. For example, a radar can be embedded in and/or mounted in or near the front bumper, front headlights, cowl, and/or hood, etc. Furthermore, one or more additional radars can be located to actively scan the side and/or rear of the vehicle 1100 for the presence of radio-reflective objects, such as by including such devices in or near the rear bumper, side panels, rocker panels, and/or undercarriage, etc.

The vehicle 1100 can include one or more cameras. For example, the one or more of the sensor systems 1102, 1104, 1106, 1108, 1110, 1112, 1114, and/or 1118 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 1100. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 1100 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 1100 can determine the distance to the points on the object. The predetermined light pattern may comprise infrared light, or radiation at other suitable wavelengths for such measurements. In some examples, the camera can be mounted inside a front windshield of the vehicle 1100. Specifically, the camera can be situated to capture images from a forward-looking view with respect to the orientation of the vehicle 1100. Other mounting locations and viewing angles of the camera can also be used, either inside or outside the vehicle 1100. Further, the camera can have associated optics operable to provide an adjustable field of view. Still further, the camera can be mounted to vehicle 1100 with a movable mount to vary a pointing angle of the camera, such as via a pan/tilt mechanism.

The vehicle 1100 may also include one or more acoustic sensors (e.g., one or more of the sensor systems 1102, 1104, 1106, 1108, 1110, 1112, 1114, 1116, 1118 may include one or more acoustic sensors) used to sense a surrounding environment of the vehicle 1100. Acoustic sensors may include microphones (e.g., piezoelectric microphones, condenser microphones, ribbon microphones, or microelectromechanical systems (MEMS) microphones) used to sense acoustic waves (i.e., pressure differentials) in a fluid (e.g., air) of the environment surrounding the vehicle 1100. Such acoustic sensors may be used to identify sounds in the surrounding environment (e.g., sirens, human speech, animal sounds, or alarms) upon which control strategy for vehicle 1100 may be based. For example, if the acoustic sensor detects a siren (e.g., an ambulatory siren or a fire engine siren), the vehicle 1100 may slow down and/or navigate to the edge of a roadway.

Although not shown in FIGS. 11A-11E, the vehicle 1100 can include a wireless communication system. The wireless communication system may include wireless transmitters and receivers that could be configured to communicate with devices external or internal to the vehicle 1100. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 1100 may include one or more other components in addition to or instead of those shown. The additional components may include electrical or mechanical functionality.

A control system of the vehicle 1100 may be configured to control the vehicle 1100 in accordance with a control strategy from among multiple possible control strategies. The control system may be configured to receive information from sensors coupled to the vehicle 1100 (on or off the vehicle 1100), modify the control strategy (and an associated driving behavior) based on the information, and control the vehicle 1100 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 11A:
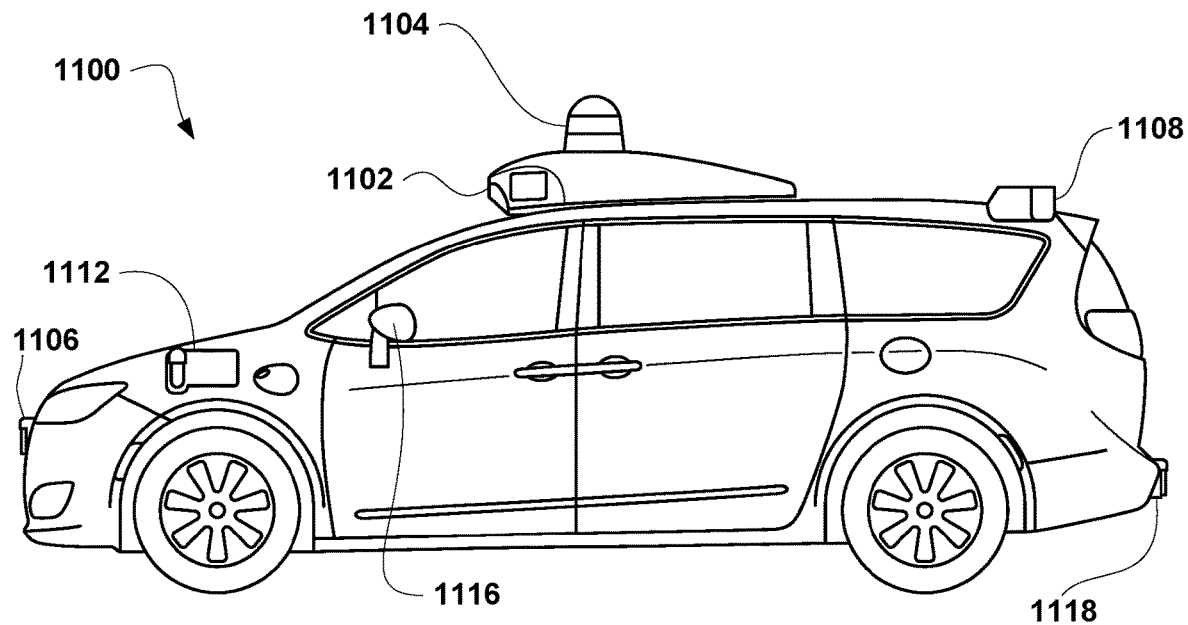
FIG. 11A is an illustration of a physical configuration of a vehicle, according to example embodiments.
Figure 11B:
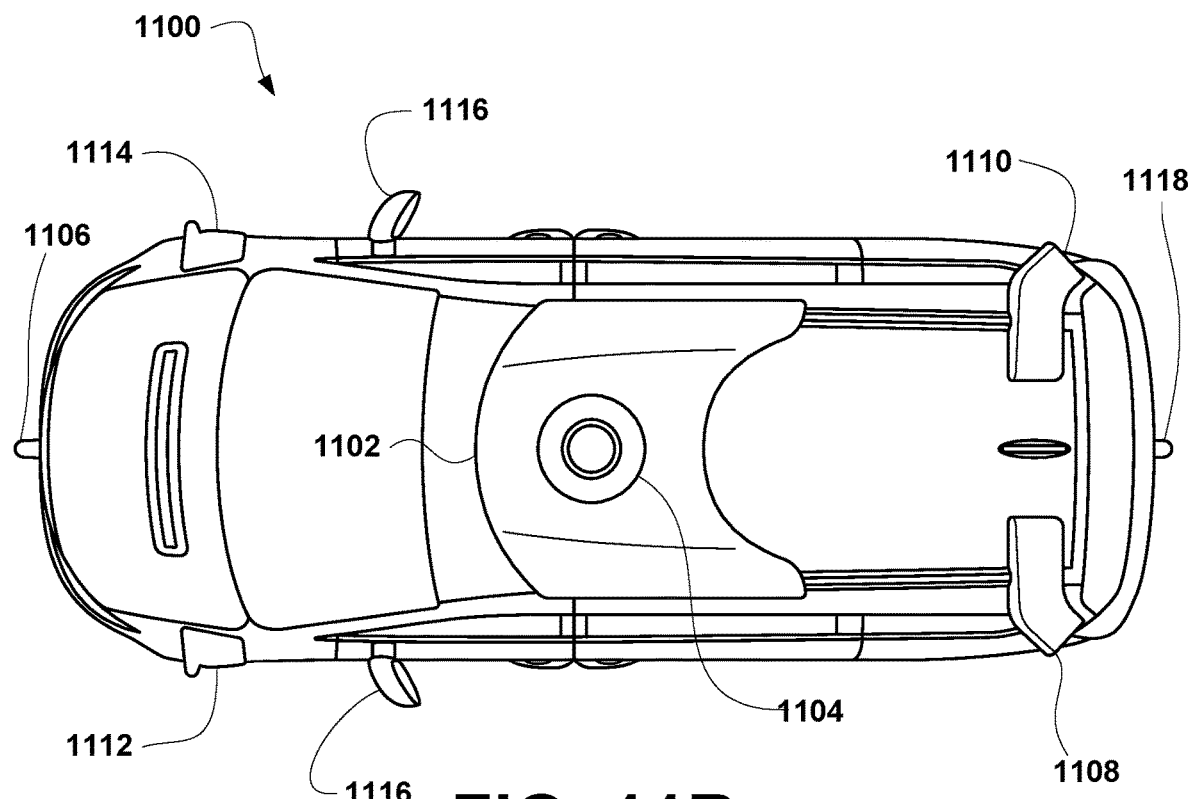
FIG. 11B is an illustration of a physical configuration of a vehicle, according to example embodiments.
Figure 11C:
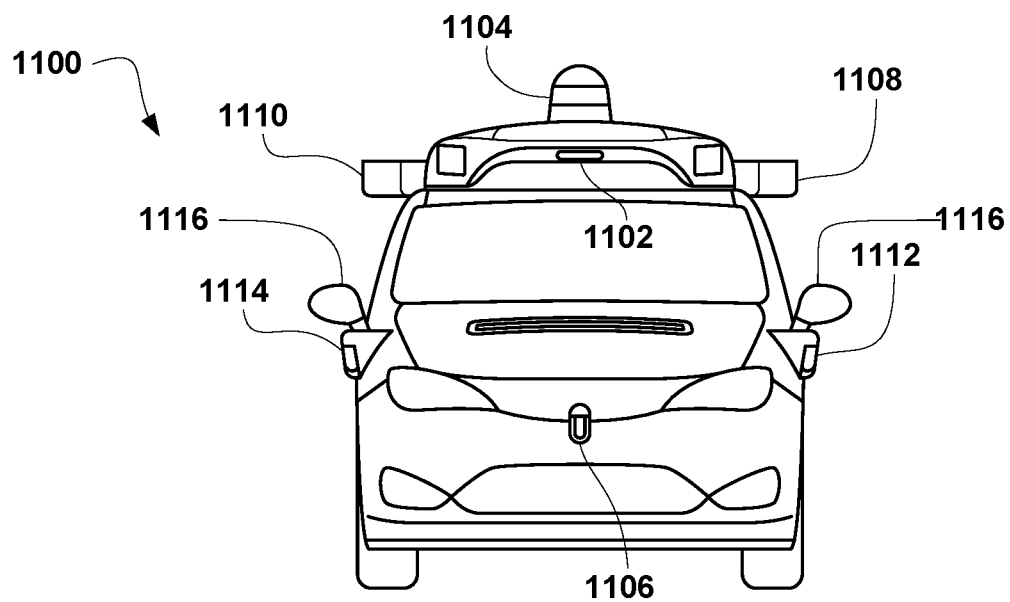
FIG. 11C is an illustration of a physical configuration of a vehicle, according to example embodiments.
Figure 11D:
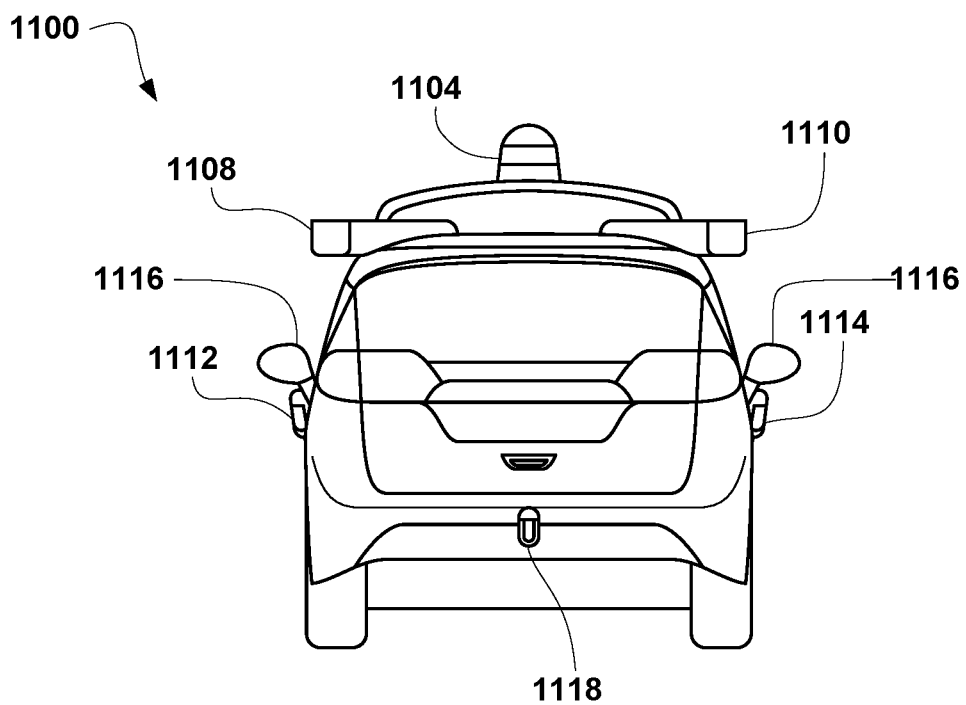
FIG. 11D is an illustration of a physical configuration of a vehicle, according to example embodiments.
Figure 11E:
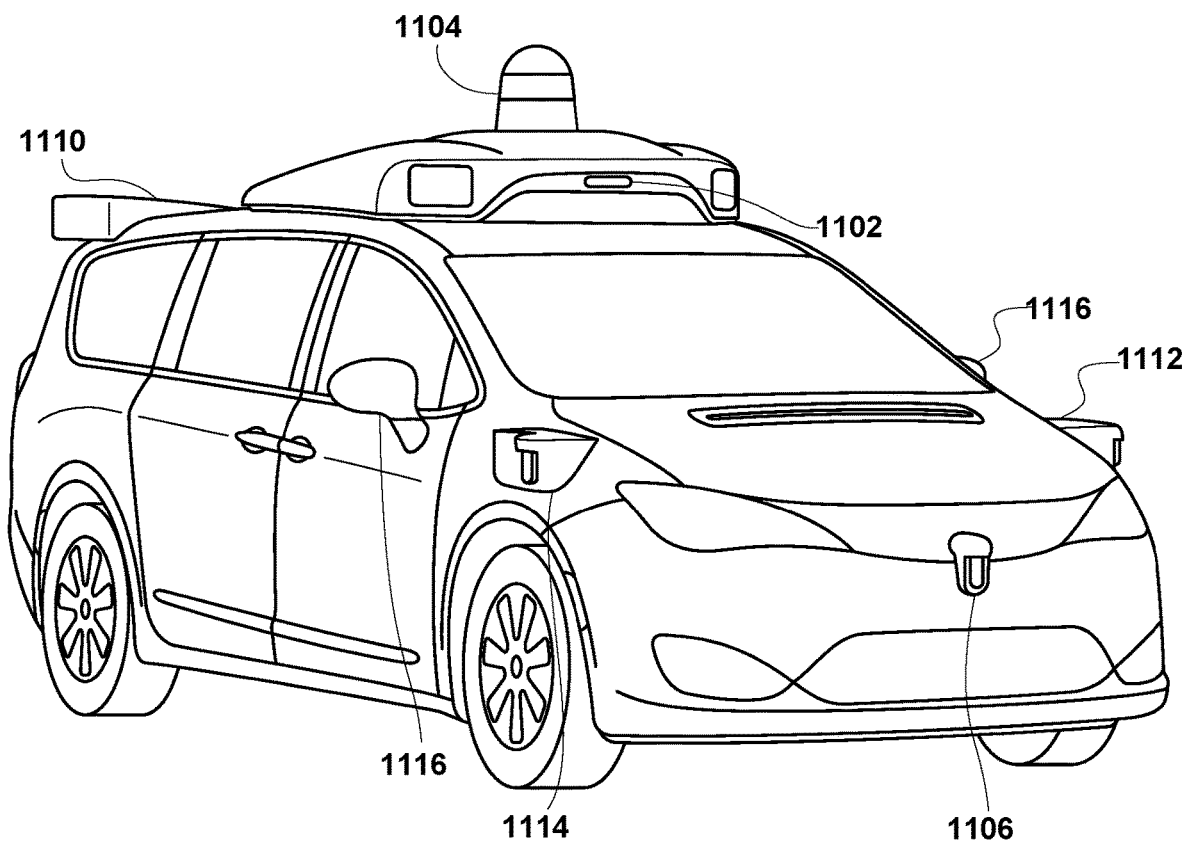
FIG. 11E is an illustration of a physical configuration of a vehicle, according to example embodiments.
Figure 11F:
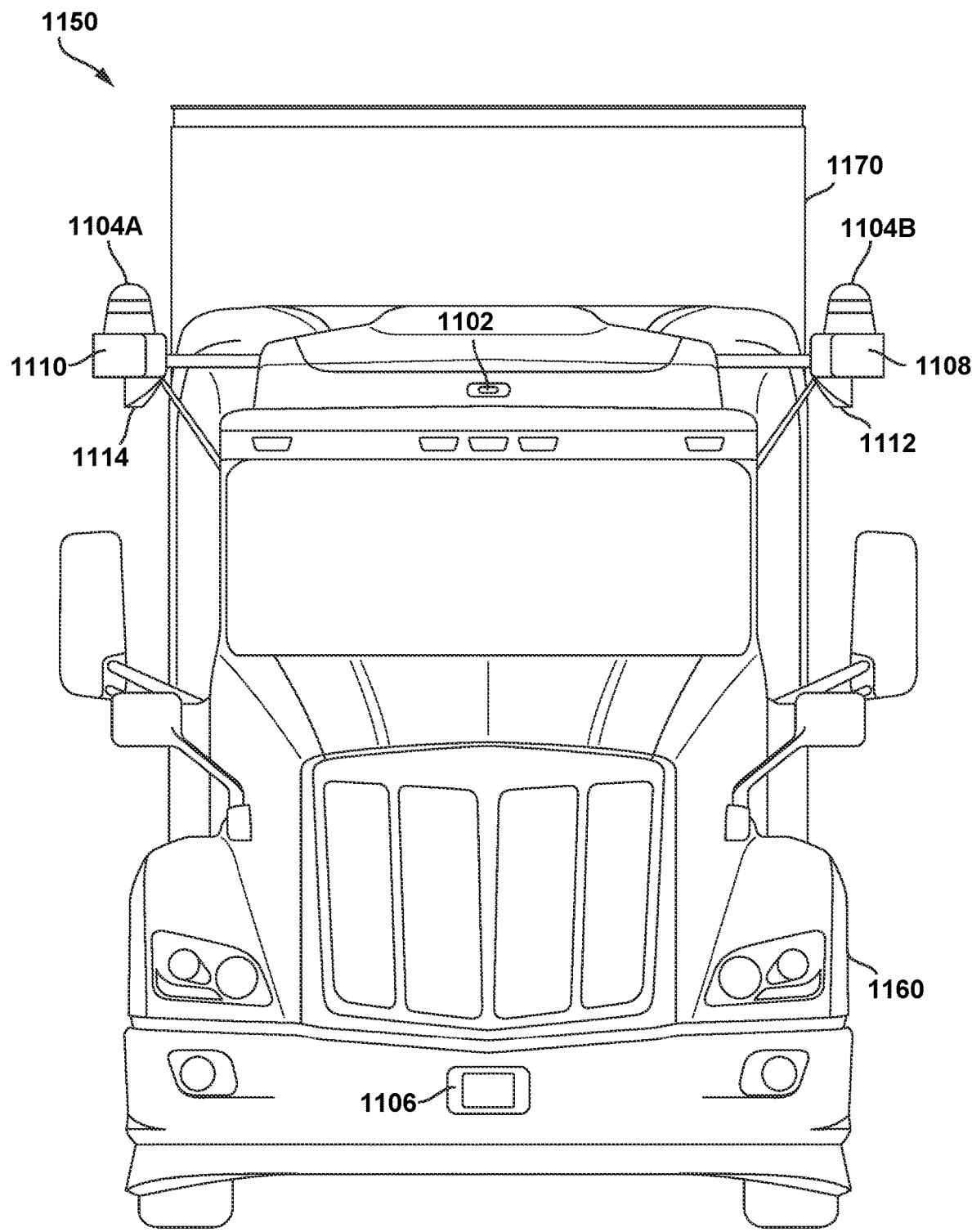
FIG. 11F is an illustration of a physical configuration of a vehicle, according to example embodiments.
Figure 11G:
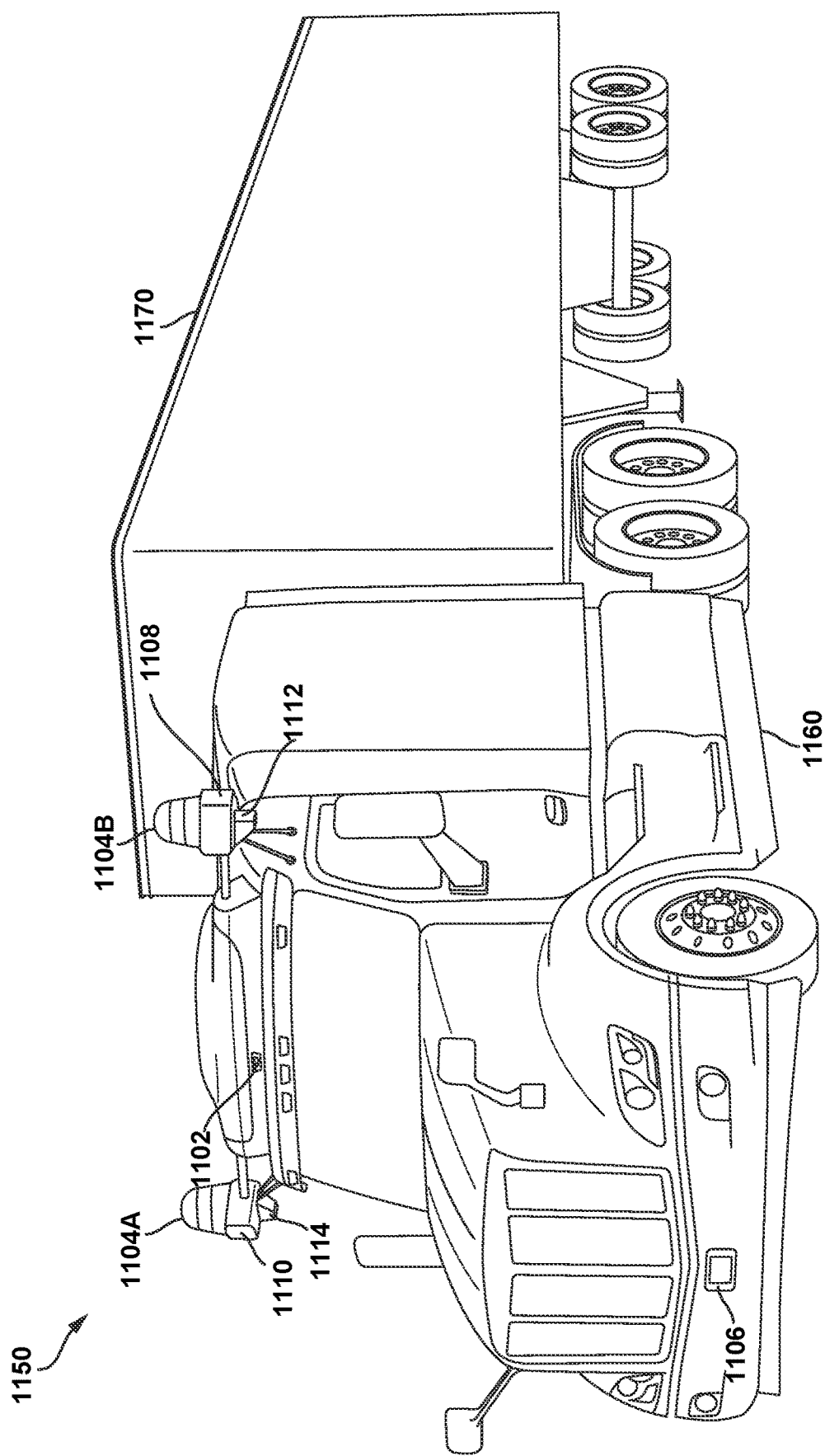
FIG. 11G is an illustration of a physical configuration of a vehicle, according to example embodiments.
Figure 11I:
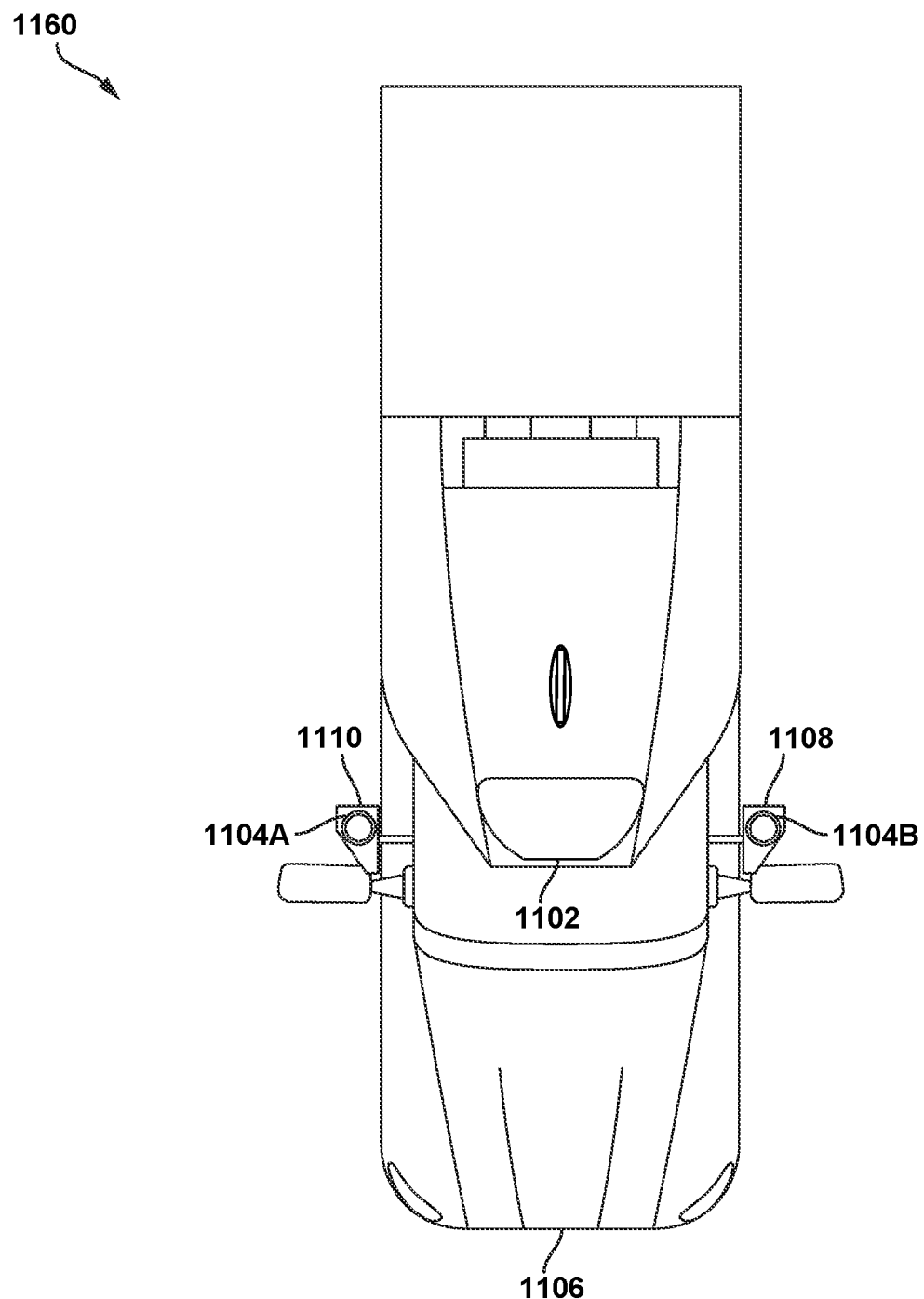
FIG. 11I is an illustration of a physical configuration of a vehicle, according to example embodiments.

As described above, in some embodiments, the vehicle 1100 may take the form of a van, but alternate forms are also possible and are contemplated herein. As such, FIGS. 11F-11I illustrate embodiments where a vehicle 1150 takes the form of a semi-truck. For example, FIG. 11F illustrates a front-view of the vehicle 1150 and FIG. 11G illustrates an isometric view of the vehicle 1150. In embodiments where the vehicle 1150 is a semi-truck, the vehicle 1150 may include a tractor portion 1160 and a trailer portion 1170 (illustrated in FIG. 11G). FIGS. 11H and 11I provide a side view and a top view, respectively, of the tractor portion 1160. Similar to the vehicle 1100 illustrated above, the vehicle 1150 illustrated in FIGS. 11F-11I may also include a variety of sensor systems (e.g., similar to the sensor systems 1102, 1106, 1108, 1110, 1112, 1114 shown and described with reference to FIGS. 11A-11E). In some embodiments, whereas the vehicle 1100 of FIGS. 11A-11E may only include a single copy of some sensor systems (e.g., the sensor system 1104), the vehicle 1150 illustrated in FIGS. 11F-11I may include multiple copies of that sensor system (e.g., the sensor systems 1104A and 1104B, as illustrated).

While drawings and description throughout may reference a given form of a vehicle (e.g., the semi-truck vehicle 1150 or the van vehicle 1100), it is understood that embodiments described herein can be equally applied in a variety of vehicle contexts (e.g., with modifications employed to account for a form factor of vehicle). For example, sensors and/or other components described or illustrated as being part of the van vehicle 1100 could also be used (e.g., for navigation and/or obstacle detection and avoidance) in the semi-truck vehicle 1150.

FIG. 11J illustrates various sensor fields of view (e.g., associated with the vehicle 1150 described above). As described above, the vehicle 1150 may contain a plurality of sensors/sensor units. The locations of the various sensors may correspond to the locations of the sensors disclosed in FIGS. 11F-11I, for example. However, in some instances, the sensors may have other locations. Sensors location reference numbers are omitted from FIG. 11J for simplicity of the drawing. For each sensor unit of the vehicle 1150, FIG. 11J illustrates a representative field of view (e.g., fields of view labeled as 1152A, 1152B, 1152C, 1152D, 1154A, 1154B, 1156, 1158A, 1158B, and 1158C). The field of view of a sensor may include an angular region (e.g., an azimuthal angular region and/or an elevational angular region) over which the sensor may detect objects.

Figure 11K:
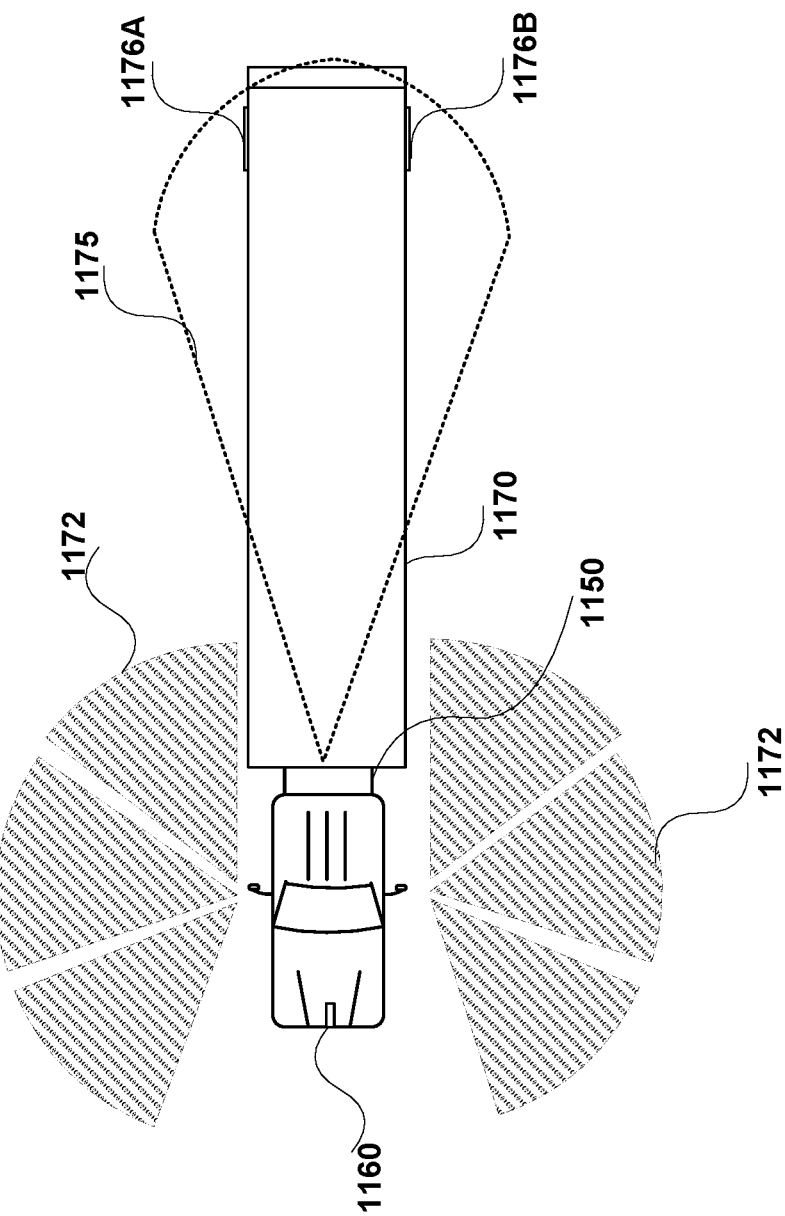
FIG. 11K is an illustration of beam steering for a sensor, according to example embodiments.

FIG. 11K illustrates beam steering for a sensor of a vehicle (e.g., the vehicle 1150 shown and described with reference to FIGS. 11F-11J), according to example embodiments. In various embodiments, a sensor unit of the vehicle 1150 may be a radar, a LIDAR, a sonar, etc. Further, in some embodiments, during the operation of the sensor, the sensor may be scanned within the field of view of the sensor. Various different scanning angles for an example sensor are shown as regions 1172, which each indicate the angular region over which the sensor is operating. The sensor may periodically or iteratively change the region over which it is operating. In some embodiments, multiple sensors may be used by the vehicle 1150 to measure the regions 1172. In addition, other regions may be included in other examples. For instance, one or more sensors may measure aspects of the trailer 1170 of the vehicle 1150 and/or a region directly in front of the vehicle 1150.

At some angles, a region of operation 1175 of the sensor may include rear wheels 1176A, 1176B of the trailer 1170. Thus, the sensor may measure the rear wheel 1176A and/or the rear wheel 1176B during operation. For example, the rear wheels 1176A, 1176B may reflect LIDAR signals or radar signals transmitted by the sensor. The sensor may receive the reflected signals from the rear wheels 1176A, 1176. Therefore, the data collected by the sensor may include data from the reflections off the wheel.

In some instances, such as when the sensor is a radar, the reflections from the rear wheels 1176A, 1176B may appear as noise in the received radar signals. Consequently, the radar may operate with an enhanced signal to noise ratio in instances where the rear wheels 1176A, 1176B direct radar signals away from the sensor.

Figure 12:
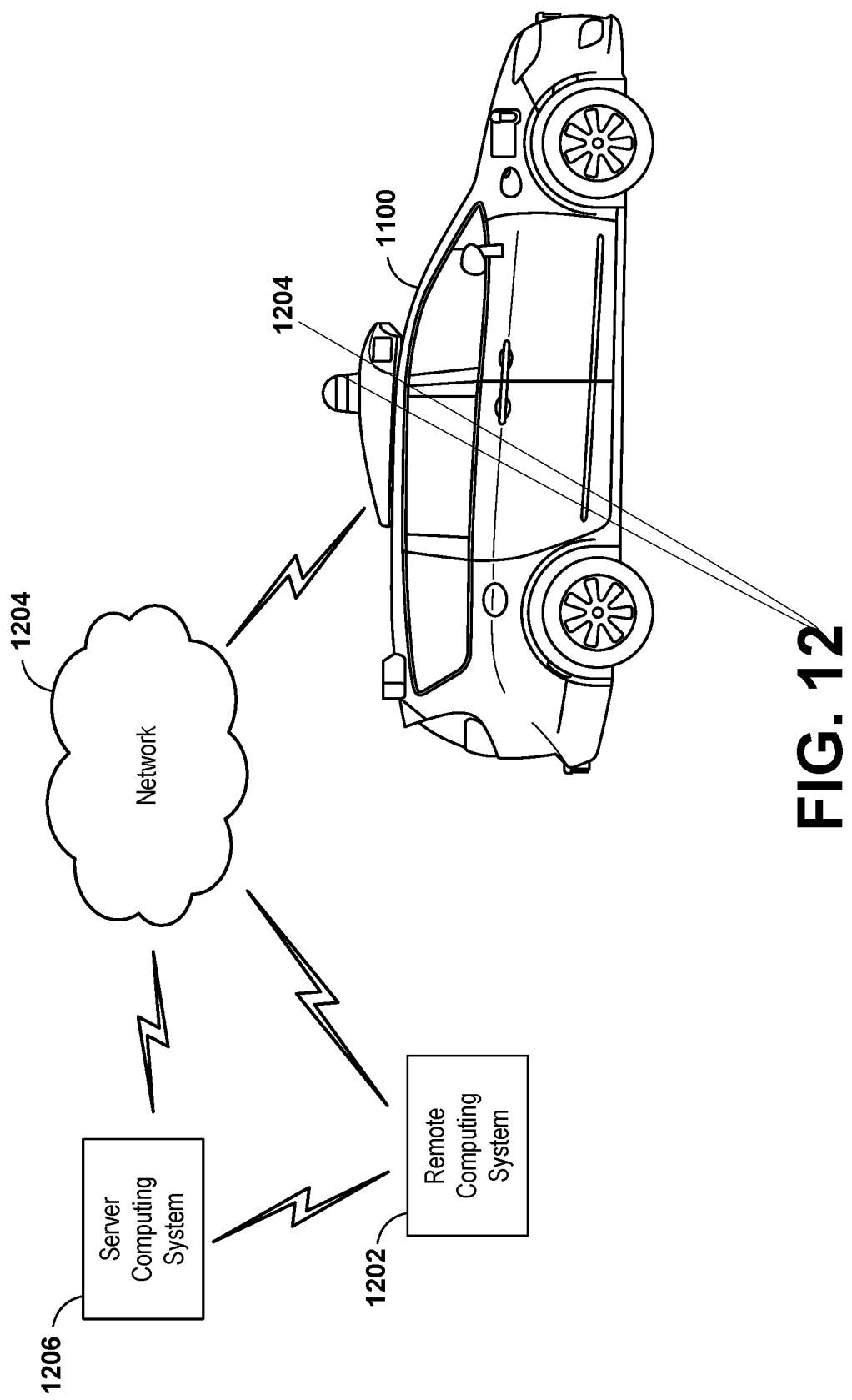
FIG. 12 is a conceptual illustration of wireless communication between various computing systems related to an autonomous or semi-autonomous vehicle, according to example embodiments.

FIG. 12 is a conceptual illustration of wireless communication between various computing systems related to an autonomous or semi-autonomous vehicle, according to example embodiments. In particular, wireless communication may occur between a remote computing system 1202 and the vehicle 1100 via a network 1204. Wireless communication may also occur between a server computing system 1206 and the remote computing system 1202, and between the server computing system 1206 and the vehicle 1100.

The vehicle 1100 can correspond to various types of vehicles capable of transporting passengers or objects between locations, and may take the form of any one or more of the vehicles discussed above. In some instances, the vehicle 1100 may operate in an autonomous or semi-autonomous mode that enables a control system to safely navigate the vehicle 1100 between destinations using sensor measurements. When operating in an autonomous or semi-autonomous mode, the vehicle 1100 may navigate with or without passengers. As a result, the vehicle 1100 may pick up and drop off passengers between desired destinations.

The remote computing system 1202 may represent any type of device related to remote assistance techniques, including but not limited to those described herein. Within examples, the remote computing system 1202 may represent any type of device configured to (i) receive information related to the vehicle 1100, (ii) provide an interface through which a human operator can in turn perceive the information and input a response related to the information, and (iii) transmit the response to the vehicle 1100 or to other devices. The remote computing system 1202 may take various forms, such as a workstation, a desktop computer, a laptop, a tablet, a mobile phone (e.g., a smart phone), and/or a server. In some examples, the remote computing system 1202 may include multiple computing devices operating together in a network configuration.

The remote computing system 1202 may include one or more subsystems and components similar or identical to the subsystems and components of the vehicle 1100. At a minimum, the remote computing system 1202 may include a processor configured for performing various operations described herein. In some embodiments, the remote computing system 1202 may also include a user interface that includes input/output devices, such as a touchscreen and a speaker. Other examples are possible as well.

The network 1204 represents infrastructure that enables wireless communication between the remote computing system 1202 and the vehicle 1100. The network 1204 also enables wireless communication between the server computing system 1206 and the remote computing system 1202, and between the server computing system 1206 and the vehicle 1100.

The position of the remote computing system 1202 can vary within examples. For instance, the remote computing system 1202 may have a remote position from the vehicle 1100 that has a wireless communication via the network 1204. In another example, the remote computing system 1202 may correspond to a computing device within the vehicle 1100 that is separate from the vehicle 1100, but with which a human operator can interact while a passenger or driver of the vehicle 1100. In some examples, the remote computing system 1202 may be a computing device with a touchscreen operable by the passenger of the vehicle 1100.

In some embodiments, operations described herein that are performed by remote computing system 1202 may be additionally or alternatively performed by vehicle 1100 (i.e., by any system(s) or subsystem(s) of vehicle 1100). In other words, vehicle 1100 may be configured to provide a remote assistance mechanism with which a driver or passenger of the vehicle can interact.

The server computing system 1206 may be configured to wirelessly communicate with the remote computing system 1202 and the vehicle 1100 via the network 1204 (or perhaps directly with the remote computing system 1202 and/or the vehicle 1100). The server computing system 1206 may represent any computing device configured to receive, store, determine, and/or send information relating to the vehicle 1100 and the remote assistance thereof. As such, the server computing system 1206 may be configured to perform any operation(s), or portions of such operation(s), that is/are described herein as performed by the remote computing system 1202 and/or the vehicle 1100. Some embodiments of wireless communication related to remote assistance may utilize the server computing system 1206, while others may not.

The server computing system 1206 may include one or more subsystems and components similar or identical to the subsystems and components of the remote computing system 1202 and/or the vehicle 1100, such as a processor configured for performing various operations described herein, and a wireless communication interface for receiving information from, and providing information to, the remote computing system 1202 and the vehicle 1100.

The various systems described above may perform various operations. These operations and related features will now be described.

In line with the discussion above, a computing system (e.g., the remote computing system 1202, the server computing system 1206, or a computing system local to vehicle 1100) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., the vehicle 1100) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a LIDAR, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a LIDAR may be configured to transmit an electromagnetic signal (e.g., infrared light, such as that from a gas or diode laser, or other possible light source) that will be reflected by target objects near the vehicle. The LIDAR may be able to capture the reflected electromagnetic (e.g., infrared light) signals. The captured reflected electromagnetic signals may enable the range-finding system (or processing system) to determine a range to various objects. The LIDAR may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a LIDAR. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 1204), and in some embodiments, via a server (e.g., server computing system 1206). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 13:
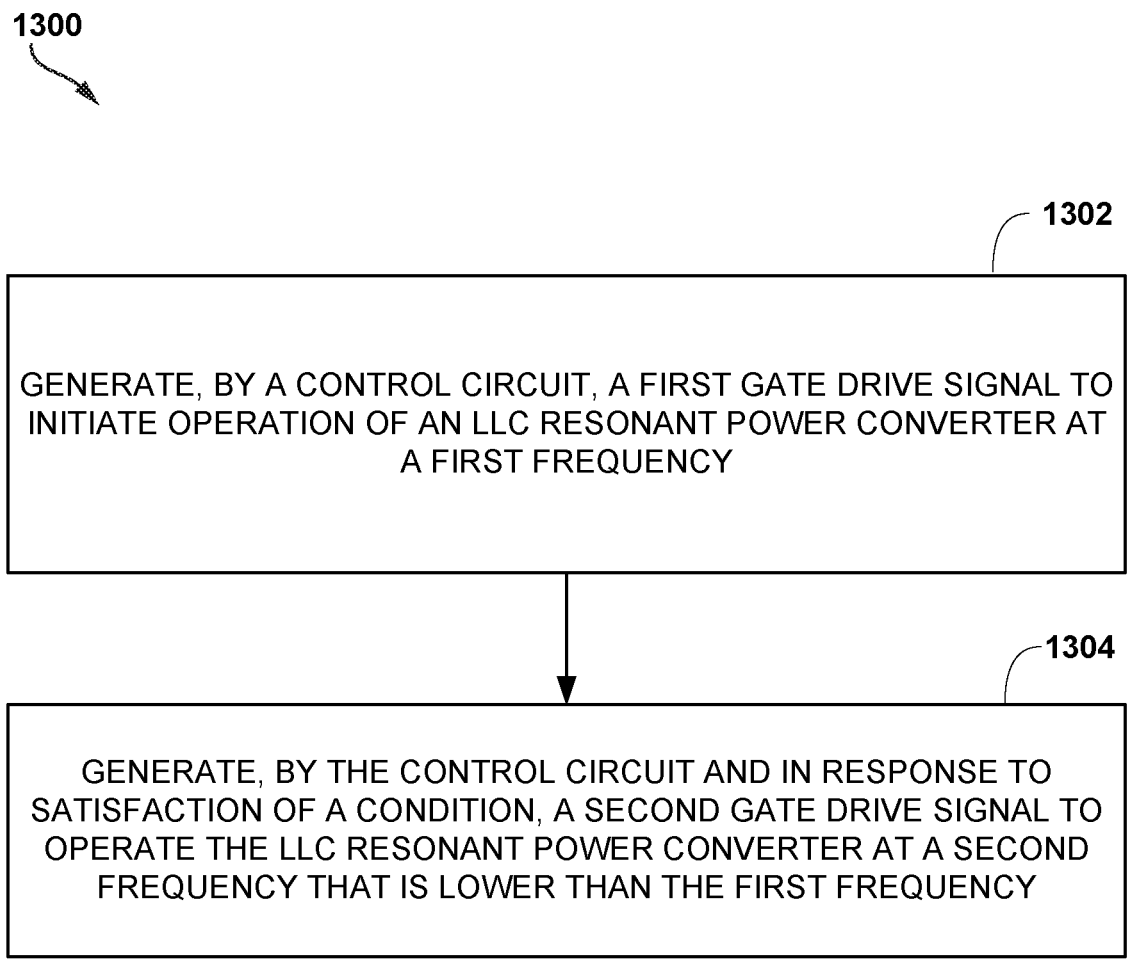
FIG. 13 is a method for soft-starting a rotary power transformer, according to example embodiments.

Referring to FIG. 13, a particular illustrative example of a method 1300 for soft-starting a rotary power transformer is shown. The method 1300 can be performed by the control circuit 170.

The method 1300 includes generating, by a control circuit, a first gate drive signal to initiate operation of an LLC resonant power converter at a first frequency, at block 1302. For example, referring to FIG. 1, the control circuit 170 generates the first gate drive signals 178 to initiate operation of the LLC resonant power converter at the first frequency 190. During operation, the LLC resonant power converter 100 drives the wireless power signal 180 at the primary winding 116 of the rotary power transformer 154 disposed on the first platform 122. During operation, the LLC resonant power converter 100 also transmits the wireless power signal 180 across the gap 126 separating the first platform 122 and the second platform 124. The second platform 124 is configured to rotate relative to the first platform 122. During operation, the LLC resonant power converter 100 further receives the wireless power signal 180 at the secondary winding 118 of the rotary power transformer 154. The secondary winding 118 is disposed on the second platform 124. During operation, the LLC resonant power converter 100 also operates, in an open loop mode without feedback control, a device (e.g., the LIDAR device 1010) mounted on the second platform 124 based on the secondary winding 118 receiving the wireless power signal 180.

The method 1300 also includes generating, by the control circuit and in response to satisfaction of a condition, a second gate drive signal to operate the LLC resonant power converter at a second frequency that is lower than the first frequency, at block 1304. For example, referring to FIG. 1, in response to satisfaction of a condition, the control circuit 170 generates the second gate drive signals 179 to operate the LLC resonant power converter 100 at the second frequency 192 that is lower than the first frequency 190.

According to one implementation of the method 1300, the condition is satisfied when a particular period of time elapses after the initiation of the operation of the LLC resonant power converter 100. The particular period of time can correspond to a time delay associated with the RC delay element 450, 650.

According to one implementation of the method 1300, the first gate drive signal 178 and the second gate drive signal 179 are generated by the oscillator 182 of the control circuit 170. The oscillator 182 can be the analog voltage controlled oscillator 206, 406 or the MEMS oscillator 606. According to another implementation of the method 1300, the first gate drive signal 178 and the second gate drive signal 179 are generated by the microcontroller 184. According to another implementation of the method 1300, the first gate drive signal 178 and the second gate drive signal 179 are generated by the crystal 186 or the timing circuit 188.

According to one implementation, the method 1300 includes detecting a fault at the LLC resonant power converter 100. In this implementation, the first gate drive signal 178 is generated in response to detecting the fault.

According to one implementation, the method 1300 includes detecting a command to activate the device mounted on the second platform 124. As a non-limiting example, a command to activate the LIDAR device 1010 can be detected. In this implementation, the first gate drive signal 178 is generated in response to detecting the command.

According to one implementation, the method 1300 includes adjusting a voltage applied to a power converter driver based on a feed-forward current initiate the operation of the LLC resonant power converter at the first frequency. The power converter driver includes a switching circuit having a full-bridge topology or a half-bridge topology.

The techniques described herein can reduce current spikes during startup of the LLC resonant power converter 100. For example, by operating the LLC resonant power converter 100 at a relatively high frequency 190 during startup, the gain of the rotary power transformer 154 is reduced as the output capacitor 136 charges. As a result, current on the secondary side of the LLC resonant power converter 100 is reduced and the likelihood of circuit components tripping during startup is reduced. By the time the soft-start period expires, the output capacitor 136 will have sufficiently charged to reduce current spikes that could otherwise cause circuit components (e.g., power supplies and load switches) to trip.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   generating, by a control circuit, a first gate drive signal to initiate operation of an LLC resonant power converter at a first frequency, wherein, during operation, the LLC resonant power converter is configured to:
   drive a wireless power signal at a primary winding of a rotary power transformer disposed on a first platform;
   transmit the wireless power signal across a gap separating the first platform and a second platform, wherein the second platform is configured to rotate relative to the first platform;
   receive the wireless power signal at a secondary winding of the rotary power transformer, wherein the secondary winding is disposed on the second platform; and
   operate, in an open loop mode without feedback control, a device mounted on the second platform based on the secondary winding receiving the wireless power signal; and
   generating, by the control circuit and in response to satisfaction of a condition, a second gate drive signal to operate the LLC resonant power converter at a second frequency that is lower than the first frequency.

2. The method of claim 1, wherein the second frequency is associated with a unity gain operating point of the LLC resonant power converter.

3. The method of claim 1, wherein the condition is satisfied when a particular period of time elapses after initiation of the operation of the LLC resonant power converter.

4. The method of claim 3, wherein the particular period of time corresponds to a time delay associated with a resistive-capacitive (RC) delay element or a time delay internal to a microcontroller.

5. The method of claim 1, wherein the first gate drive signal and the second gate drive signal are generated by an oscillator of the control circuit.

6. The method of claim 5, wherein the oscillator is an analog voltage controlled oscillator or a microelectromechanical systems (MEMS) oscillator.

7. The method of claim 1, wherein the first gate drive signal and the second gate drive signal are generated by a crystal or a timing circuit.

8. The method of claim 1, wherein the first gate drive signal and the second gate drive signal are generated by a microcontroller of the control circuit.

9. The method of claim 1, further comprising detecting a fault at the LLC resonant power converter, wherein the first gate drive signal is generated in response to detecting the fault.

10. The method of claim 1, further comprising detecting a command to activate the device mounted on the second platform, wherein the first gate drive signal is generated in response to detecting the command.

11. The method of claim 1, further adjusting a voltage applied to a power converter driver based on a feed-forward current to initiate the operation of the LLC resonant power converter at the first frequency.

12. The method of claim 11, wherein the power converter driver comprises a switching circuit having a full-bridge topology or a half-bridge topology.

13. A system comprising:
a control circuit; and
an LLC resonant power converter,
wherein the control circuit is configured to generate a first gate drive signal to initiate operation of the LLC resonant power converter at a first frequency,
wherein, during operation, the LLC resonant power converter is configured to:
   drive a wireless power signal at a primary winding of a rotary power transformer disposed on a first platform;
   transmit the wireless power signal across a gap separating the first platform and a second platform, wherein the second platform is configured to rotate relative to the first platform;
   receive the wireless power signal at a secondary winding of the rotary power transformer, wherein the secondary winding is disposed on the second platform; and
   operate, in an open loop mode without feedback control, a device mounted on the second platform based on the secondary winding receiving the wireless power signal, and
wherein, in response to satisfaction of a condition, the control circuit is further configured to generate a second gate drive signal to operate the LLC resonant power converter at a second frequency that is lower than the first frequency.

14. The system of claim 13, wherein the second frequency is associated with a unity gain operating point of the LLC resonant power converter.

15. The system of claim 13, wherein the condition is satisfied when a particular period of time elapses after initiation of the operation of the LLC resonant power converter.

16. The system of claim 13, wherein the control circuit comprises an oscillator, and wherein the first gate drive signal and the second gate drive signal are generated by the oscillator.

17. The system of claim 13, wherein the control circuit comprises a microcontroller, and wherein the first gate drive signal and the second gate drive signal are generated by the microcontroller.

18. A non-transitory computer-readable medium comprising instructions that, when executed by a microcontroller, cause the microcontroller to perform operations comprising:
   generating a first gate drive signal to initiate operation of an LLC resonant power converter at a first frequency,
   wherein, during operation, the LLC resonant power converter is configured to:
      drive a wireless power signal at a primary winding of a rotary power transformer disposed on a first platform;
      transmit the wireless power signal across a gap separating the first platform and a second platform, wherein the second platform is configured to rotate relative to the first platform;
      receive the wireless power signal at a secondary winding of the rotary power transformer, wherein the secondary winding is disposed on the second platform; and
      operate, in an open loop mode without feedback control, a device mounted on the second platform based on the secondary winding receiving the wireless power signal; and
   generating, in response to satisfaction of a condition, a second gate drive signal to operate the LLC resonant power converter at a second frequency that is lower than the first frequency.

19. The non-transitory computer-readable medium of claim 18, wherein the second frequency is associated with a unity gain operating point of the LLC resonant power converter.

20. The non-transitory computer-readable medium of claim 18, wherein the condition is satisfied when a particular period of time elapses after initiation of the operation of the LLC resonant power converter.

* * * * *